United States Patent [19]

Jewitt

[11] Patent Number: 6,078,747

[45] Date of Patent: Jun. 20, 2000

[54] APPLICATION PROGRAM INTERFACE TO PHYSICAL DEVICES

[76] Inventor: James W. Jewitt, P.O. Box 758 #2 Rooster Hill Rd., Valley Forge, Pa. 19481-0758

[21] Appl. No.: 09/002,818

[22] Filed: Jan. 5, 1998

Related U.S. Application Data

[60] Provisional application No. 60/038,887, Feb. 20, 1997.

[51] Int. Cl.[7] ........................................... G06F 9/45
[52] U.S. Cl. ................................................. 395/712
[58] Field of Search ..................................... 395/712, 701

[56] References Cited

U.S. PATENT DOCUMENTS

| | | | |
|---|---|---|---|
| 4,570,217 | 2/1986 | Allen et al. | 364/188 |
| 4,649,479 | 3/1987 | Advani et al. | 364/300 |
| 4,835,685 | 5/1989 | Kun | 364/200 |
| 4,855,936 | 8/1989 | Casey et al. | 395/118 |
| 4,972,368 | 11/1990 | O'Brien et al. | 395/887 |
| 5,029,077 | 7/1991 | Fatahalian et al. | 345/112 |
| 5,265,252 | 11/1993 | Rawson et al. | 395/700 |
| 5,369,770 | 11/1994 | Thomason et al. | 710/260 |
| 5,491,813 | 2/1996 | Bondy et al. | 395/500 |
| 5,671,442 | 9/1997 | Feeney et al. | 395/834 |
| 5,867,495 | 2/1999 | Elliott et al. | 370/352 |

OTHER PUBLICATIONS

Sitsky et al. Implementing MPI Under AP/Linux. IEEE. pp. 32–39, 1996.

Chang et al. 801 Storage: Architecture and Programming. ACM Transactions on Computer Systems. vol. 6, No. 1. pp. 28–50, Feb. 1988.

Druschel. Operating System Support for High–speed Communications. ACM. pp. 41–51, Sep. 1996.

Chen et al. The Impact of Operating System Structure on Memory System Performance. ACM. pp. 120–133, 1993.

*Primary Examiner*—Tariq R. Hafiz
*Assistant Examiner*—Wei Zhen

[57] ABSTRACT

In a computer system, a programming interface between application programs and a physical device. The application programs (41, 42) may include executable programs and dynamic-linked libraries. The application program interface of the present invention consists of private data and a library of routines (51) which expose the functionality of the physical device (1). Furthermore, the programming interface is provided in a dynamic-linked library so that the library of routines may be shared between the application programs and utilized by the application programs in conjunction with other such programming interfaces (52, 53) to additional physical devices (2, 3). The library of routines of the programming interface are dynamically bound to the application programs and translate hardware-independent device operations requested by application programs directly into hardware-dependent device operations which do not require the use of a device driver. Therefore, exactly one level of dynamic binding is utilized to provide the programming interface of the present invention. In preferred embodiments of the present invention, two such programming interfaces permit the development of visual programs with deterministic execution and response times in a multi-tasking environment, and which execute at speeds which are significantly faster than visual programs in the prior art.

5 Claims, 5 Drawing Sheets

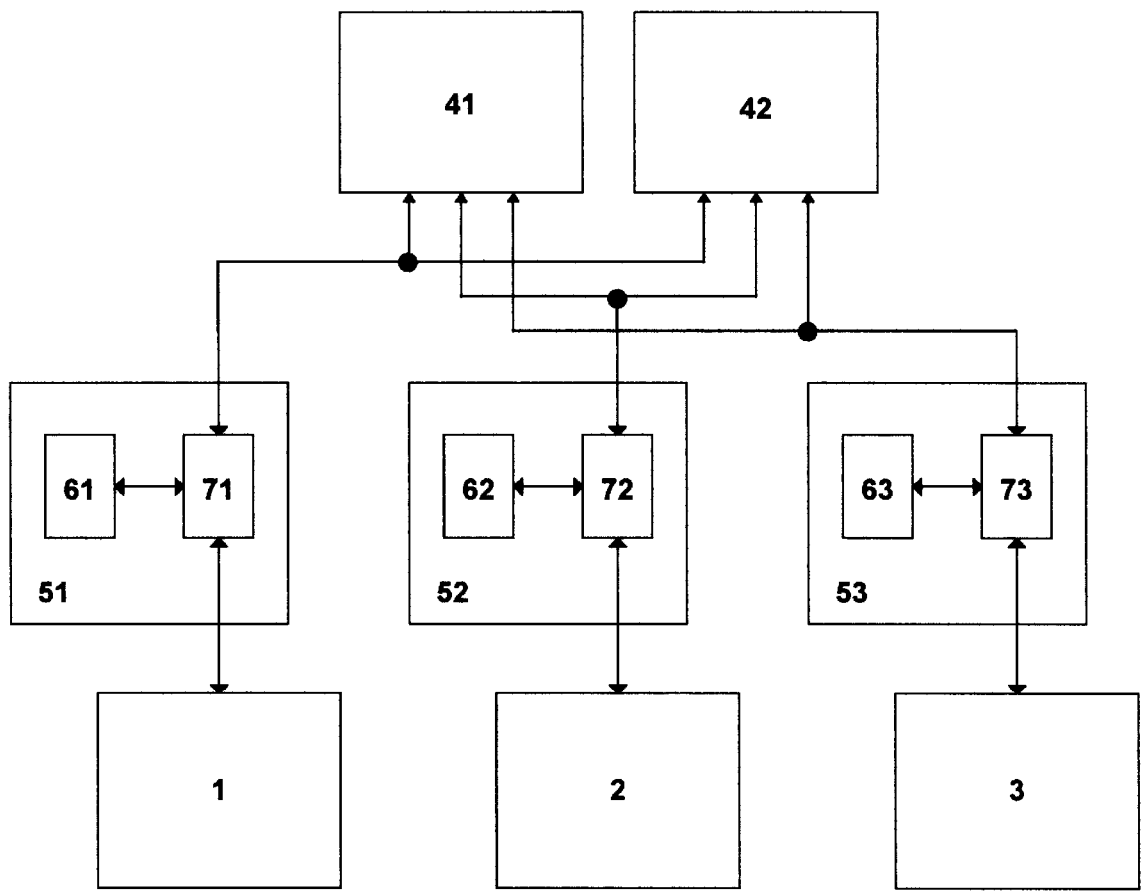
FIG. 3
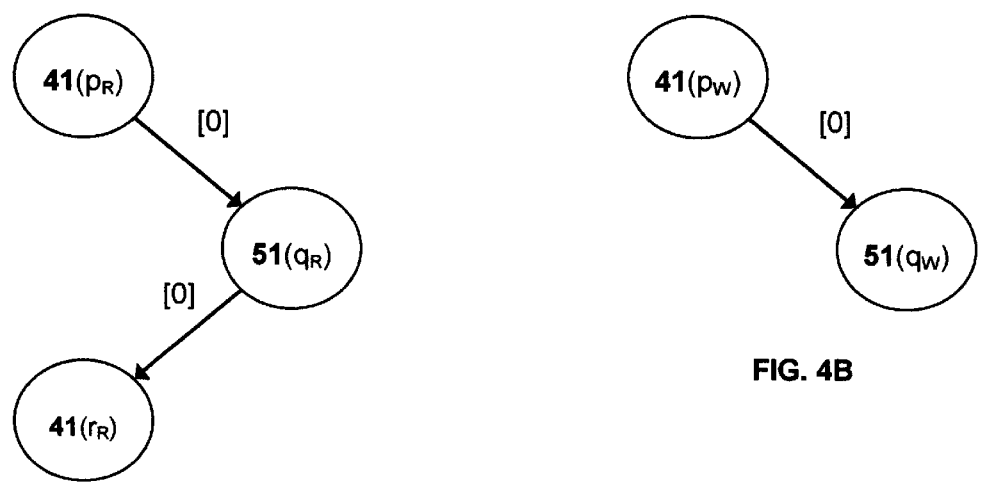
FIG. 4A
FIG. 4B

```
3  00 08 02 10
2  12 04 14 07
1  03 11 01 09
0  15 06 13 05
   0  1  2  3
         i
```
FIG. 5A
0
FIG. 5B
1
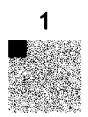
FIG. 5C
2
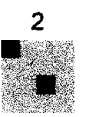
FIG. 5D
3
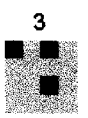
FIG. 5E
4
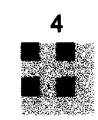
FIG. 5F
5
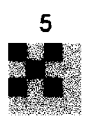
FIG. 5G
6
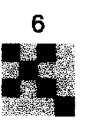
FIG. 5H
7
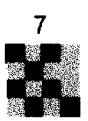
FIG. 5I
8
FIG. 5J
9
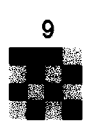
FIG. 5K
10
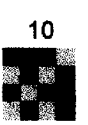
FIG. 5L
11
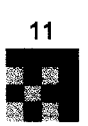
FIG. 5M
12
FIG. 5N
13
FIG. 5O
14
FIG. 5P
15
FIG. 5Q
16
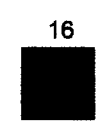
FIG. 5R

|  | JustifyLeft | JustifyCenter | JustifyRight |
|---|---|---|---|
| JustifyTop | ABCXABC<br>ABCXABC | ABCXABC<br>ABCXABC | ABCXABC<br>ABCXABC |
| JustifyMiddle | ABCXABC<br>ABCXABC | ABCXABC<br>ABCXABC | ABCXABC<br>ABCXABC |
| JustifyBottom | ABCXABC<br>ABCXABC | ABCXABC<br>ABCXABC | ABCXABC<br>ABCXABC |

FIG. 6

APPLICATION PROGRAM INTERFACE TO PHYSICAL DEVICES

CROSS-REFERENCE TO RELATED APPLICATIONS

This application claims priority from U.S. provisional application Ser. No. 60/038,887 filed Feb. 20, 1997.

BACKGROUND

1. Field of Invention

The present invention generally relates to programming interfaces between application programs and physical devices in a computer system.

2. Description of Prior Art

A process, which exists in a current or suspended state of execution, consists of a sequence of microprocessor instructions that have been loaded into random access memory in order to perform a task together with some private memory. The private memory is utilized to record state information during periods of suspended activity and as a buffer to store input and output data. Multiple processes which are simultaneously present in a computer system are known in the prior are as concurrent processes. Concurrent processes compete for limited system resources such as cache memory, random access memory, microprocessor instruction cycles, and access to physical devices. A mutual exclusion constraint exists in that two or more processes are not able to access the same system resource at the same instant of time. Cost-effective, personal computer systems, for example, provide only a single microprocessor for the execution of concurrent processes, in which case only one process is in a current state of execution and all others are in a suspended state of execution.

An application program provides a mechanism by which the human operator instructs the computer to perform tasks. The application spawns either a single process or multiple processes that are linked by cooperative relationships. Furthermore, multiple applications may be present in a computer system. An operating system is a set of functions that provide, at a minimum, a means of invoking application programs for execution and a man-machine interface between the human operator and computer system when no application programs are present. Operating systems also provide services that are common to a variety of applications and which require utilization of physical devices. Scheduling services, for example, requires utilization of a timing device to manage concurrent process access to microprocessor instruction cycles. A graphical user interface provides access to the video graphics adapter and mouse. In another example, dynamic memory management provides access to random access memory. Other system services that may or may not be provided by a particular operating system include inter-process communication, network connectivity, web browsing, dynamic-link library support, virtual memory management, cache management, security from external tampering, and protection from computer viruses. Operating systems are distinguished by the number and functionality of system services that they provide, the resources that are consumed in order to provide these services, and the intellectual complexity of the application program interface.

Certain operating system services that are explicitly requested by application programs using an application program interface. Application program interfaces consist of data and a library of routines which are provided in a dynamic-linked library. The library of routines that are utilized by a specific application program are dynamically linked to that application program each time it is invoked by the operating system, and differ from routines in software libraries that are statically linked to the application program exactly one time prior to program execution. It is well known in the prior art that a maximum of one copy of the data and library of routines provided by a dynamic-link library is stored in random access memory at any given time, independently of the number of application programs which are present.

Referring to FIG. 1, a prior art programming interface between application programs and physical devices being utilized is shown. An operating system 10, two separate applications programs 41, 42 and three separate physical devices 1, 2, 3 are present. Next, the operating system consists of a kernel 20, three separate device drivers 11, 12, 13 and three separate application program interfaces 31, 32, 33.

The kernel 20 schedules the execution times of concurrent processes which are spawned by the application programs, application program interfaces, and device drivers. The kernel is itself a process and therefore must schedule its own activity. Microprocessor instruction cycles are viewed as a system resource, so that process execution time coincides with the scheduled allocation of microprocessor instruction cycles to that process. In some cases, concurrent processes operate independently of each other. In other cases, concurrent processes are linked by cooperative towards the goal of achieving some high level task. The cooperative relationships may be viewed as a sequence of cause-and-effect relationships. Furthermore, each cause-and-effect relationship involves a secondary process and one or more primary processes. The secondary process accepts as an input data and control information produced by the primary processes in order to perform an intermediate task towards the ultimate goal of completing some higher level task. A precedence constraint exists in that the availability of the data and control information produced by the primary processes must precede execution of the secondary process. The time elapsed time beginning when the secondary process is invoked to complete the task and ending with task completion equals the sum of the execution time and scheduling delay. The execution time equals the elapsed time beginning when the secondary process obtains the system resources and inputs which are necessary for task completion, and ending when the secondary process completes the task. The scheduling delay equals the elapsed time beginning when the secondary process is invoked to complete the task, and ending when the secondary process obtains the system resources and the inputs which are required for task completion.

Application programs 41, 42 utilize the application program interfaces 31, 32, 33 in order to request services that require utilization of the physical devices 1, 2, 3. In the prior art, application program interfaces 31, 32, 33 do not directly manipulate any of the physical devices 1, 2, 3. Instead, the application program interfaces incorporate a hardware-independent, abstract representation of generic physical devices. This representation is utilized to generate a sequence of abstract operations which are performed by the generic device in response to requests for services that require utilization of the physical devices. Abstract device operations generated by the application program interfaces, which vary in number depending upon the particular service that is requested by the application programs, are sent to the kernel in the form of variable-length messages. As an intermediate step in the processing, the application program interface executes any computational algorithms that are required to decompose requested services into the appropriate sequence of abstract device operations.

The kernel 20 accepts as an input messages containing a variable-length sequence of abstract device operations from the application program interfaces. Each abstract device operation is validated by the kernel in the case of operating systems that are alleged in the prior art to insure computer system integrity and to protect the system from external tampering. Next, the appropriate device driver is identified by the kernel and designated to manipulate the physical device as specified by the abstract device operations.

Device drivers provide a low-level interface to physical devices. Each device driver translates abstract device operations into actual device operations which are hardware-dependent and specific to the particular physical device in use. It can be seen by those skilled in the prior art that the application programs, application program interfaces, and kernel are independent upon the type of physical device being utilized. Hardware independence of the operating system is achieved by dynamically linking the kernel 20 with the set of device drivers 11, 12, 13 that are compatible with the particular set of physical devices 1, 2, 3, respectively, that are present.

Interrupts originating from the physical devices 1, 2, 3 are not delivered directly to application programs 41, 42. Instead, the device drivers 11, 12, 13 incorporate interrupt service routines which intercept and process interrupts originating from physical devices 1, 2, 3, respectively. The interrupt service routines send a message to the kernel 20 in order to communicate the results of intercepting and processing the interrupts. The kernel 20 dispatches these messages to the appropriate application program interfaces 31, 32, 33. Application program interfaces 31, 32, 33 perform additional processing on messages originating from device driver interrupt service routines, and output new messages to application programs 41, 42 indicating the results of the processing.

It can be seen that the operating system provides application programs with indirect access to physical devices using a method that involves the execution of three processes per physical device. The response time required by application programs 41, 42 to respond to random events equals the sum of the scheduling delays and execution times of the three operating system processes which cooperate in order to intercept and respond to interrupts originating from physical devices 1, 2, 3. Similarly, the service time required by application programs 41, 42 to access physical devices 1, 2, 3 equals the sum of the scheduling delays and execution times of the three operating system processes which cooperate in order to provide the requested service.

With reference to FIG. 1, application program 41 must execute prior to application program interface 31 in order to request services that require reading data and status words from physical device 1. Application program interface 31 must execute prior to the kernel 20 in order to generate the corresponding sequence of abstract device operations. The kernel 20 must execute prior to the device driver 11 in order to validate the sequence of abstract device operations and identify device driver 11 from among the device drivers that are present. The device driver 11 must execute prior to the kernel 20 in order to translate the abstract device operations into actual device operations in order to read the data and status words from physical device 1. Once this output becomes available, the device driver 11 creates a message containing the data and status words for input to the kernel. The kernel 20 must execute prior to application program interface 31 in order to receive the message containing the data and status words from the device driver 11. Finally, the application program interface 31 must execute prior to application program 41 in order to receive the message containing the data and status words from the kernel 20. In this example, process input-output relationships and process execution times are represented by the precedence graph of FIG. 2A. The numbers shown in parenthesis and brackets, all of which are quantities greater than zero, equal process execution times and scheduling delays, respectively. If process 41 begins execution at time t=0 then the aforementioned process sequence evolves as follows:

(a) process 41 for the period beginning at t=0 and ending at $t=a_R$;

(b) process 31 for the period beginning at $t=a_R+u_R$ and ending at $t=a_R+b_R+u_R$;

(c) process 20 for the period beginning at $t=a_R+b_R+u_R+v_R$ and ending at $t=a_R+b_R+c_R+u_R+v_R$;

(d) process 11 for the period beginning at $t=a_R+b_R+c_R+u_R+v_R+w_R$ and ending at $t=a_R+b_R+c_R+d_R+u_R+v_R+w_R$;

(e) process 20 for the period beginning at $t=a_R+b_R+c_R+d_R+u_R+v_R+w_R+x_R$ and ending at $t=a_R+b_R+c_R+d_R+e_R+u_R+v_R+w_R x_R$;

(f) process 31 for the period beginning at $t=a_R+b_R+c_R+d_R+e_R+u_R+v_R+w_R+x_R+y_R$ and ending at $t=a_R+b_R+c_R+d_R+e_R+f_R+u_R+v_R+w_R+x_R+y_R$; and (g) process 41 for the period beginning at $t=a_R+b_R+c_R+d_R+e_R+f_R+u_R+v_R+w_R+x_R+y_R$ and ending at $t=a_R+b_R+c_R+d_R+e_R+f_R+g_R+u_R+v_R+w_R+x_R+y_R+z_R$.

It can be seen from this example that minimization of the service time required for application programs to read data and status words from physical devices, which corresponds to zero scheduling delay such that $u_R+v_R+w_R+x_R+y_R+z_R=0$, is not achieved in the prior art.

In another example, application program 41 must execute prior to application program interface 31 in order to request services that require writing data and control words to physical device 1. Application program interface 31 must execute prior to the kernel 20 in order to generate the corresponding sequence of abstract device operations. The kernel 20 must execute prior to the device driver 11 in order to validate the sequence of abstract device operations and identify device driver 11 from among the device drivers that are present. Finally, the device driver 11 must execute prior to the kernel 20 in order to translate the abstract device operations into actual device operations in order to write data and control words to physical device 1. In this example, process input-output relationships and process execution times are represented by the precedence graph of FIG. 2B. If process 41 begins execution at time t=0 then the process sequence evolves as follows:

(a) process 41 for the period beginning at t=0 and ending at $t=a_w$;

(b) process 31 for the period beginning at $t=a_w+u_w$ and ending at $t=a_w+b_w+u_w$;

(c) process 20 for the period beginning at $t=a_w+b_w+u_w+v_w$ and ending at $t=a_w+b_w+c_w+u_w+v_w$; and (d) process 11 for the period beginning at $t=a_w+b_w+c_w+u_w+v_w+w_w$ and ending at $t=a_w+b_w+c_w+d_w+u_w+v_w+w_w$.

It can be seen from this example that minimization of the service time required for application programs to write data and control words to physical devices, which corresponds to zero scheduling delay such that $u_w+v_w+w_w+x_w+y_w+z_w=0$, is not achieved in the prior art.

Two types of prior information are available to schedule the activity of concurrent processes. The first type of prior information includes the priority of the task performed by each process. The second type of prior information includes process duration, execution time, and precedence constraints. A problem exists in that the kernel exploits the first type of prior information but not the second. The kernel 20 utilizes a simple priority queue or priority queue with preemption to schedule the activity of concurrent processes based task priority. The result is that the actual order and duration of process activation is inconsistent with process sequence input-output relationships and execution times. This inconsistency tends to increase scheduling delay, thereby degrading application program performance in terms of service and response times. Application program performance analysis, which takes the form of a queuing system with probabilistic arrival and service times, is non-deterministic and may only be characterized in terms of temporally averaged quantities.

In the prior art, a problem exists in that dynamic scheduling results in an exponential degradation in application program performance with increasing utilization of system resources. This behavior is predicted by queuing theory. Utilization of a system resource is characterized by a utilization factor. The utilization factor is a number between zero and one equal to the fraction of time that the resource is utilized by any process. The kernel is a process and must therefore allocation system resources to itself at the expense of the amount of resources which are available to all other processes which are present. A similar problem exists in that attempts to reduce scheduling delays using improved methods of dynamic scheduling must be traded against the fact that these methods require increased computation, thereby increasing scheduling delays due to increased kernel utilization of system resources.

In the prior art, a problem exists in that operating system performance cannot be traded against functionality in order to satisfy the broad spectrum of requirements corresponding to a diverse suite of applications. Operating systems developed for the IBM personal computer and compatibles, for example, have evolved to provide the functionality required by word processors, spreadsheets, and Web browsers. This functionality is not important in the case of real-time and embedded systems and engineering workstations. Furthermore, the resources which are consumed in order to provide this functionality tends to increase random scheduling delays. Engineering workstations require high-speed execution of computational algorithms used for modeling, simulation, filtering, prediction, and computer-aided design. Real-time and embedded systems monitor and control physical processes, and require data acquisition and processing capability in real-time, i.e., without the loss of temporal information, combined with a deterministic response to external events. Applications of real-time and embedded systems include smart appliances, environmental control, industrial process control, condition monitoring, signal and image processing, patient monitoring, data acquisition, robotics, machine vision, target tracking, security access, mobile robots, factory robots, sentry robots, traffic information display and control, components management, process control, quality control, vehicle control, telecommunication switches, and real-time event logging.

A problem exists in that new features are added to subsequent releases of the operating system, even after the benefit of the added features becomes negligible, the intellectual complexity of the application program interface becomes unmanageable, and average scheduling delays grow exponentially due to increased utilization of system resources. This problem is known in the prior art as creeping featuritis. An example of unbounded queuing delays resulting from creeping featuritis is the vicious virtual memory cycle, as described in the text book by G. Wm. Kadnier, entitled *Windows NT 4: The Complete Reference,* published by Osborne McGraw-Hill, and in particular Chapter 3 entitled "Setting Up Your System". Additional articles documenting creeping featuritis include articles by M. Leon, entitled "Java Battles Bloatware", which appeared on page 2 in *InfoWorld,* Jan. 6, 1997; M. Vizard, entitled "Is A Modular OS The Next Bloatware Cure?", which appeared on pages 1 and 18 in *InfoWorld,* Jan. 6, 1997; J. Dvorak, entitled "Inside Track", which appeared on page 89 in *PC Magazine,* Feb. 18, 1997; J. Dodge, entitled "Of Hard Drivers, Bloatware And Stubborn Fish Odor", which appeared on page 89 in *PC Week,* Jan. 27, 1997; J. Dodge, entitled "When It Comes To Their Own PCs, Pros Take It Personally", which appeared on page 3 in *PC Week,* Feb. 10, 1997; and B. Livingston, entitled "Though You'd Had Enough Fun? Here's More With Resource Ids In Windows 95", *Infoworld,* which appeared on page 32 in Jan. 27, 1997.

A problem exists in the prior art in that the testing used to validate the correct operation of operating system is inadequate. Recent experience indicates that the only difference between operating system development and maintenance is that a delivery date exists between these two activities. Evidence of the lack of validation testing is well documented in the current literature. See the articles by N. Petrely, entitled "IBM wins 1996 Fatal Error Awards And Shares General Protection Fault Awards With Microsoft", which appeared on page 126 in *Infoworld* Jan. 27, 1997; and B. Livingston, entitled "Though You'd Had Enough Fun? Here's More With Resource Ids In Windows 95", which appeared on page 32 of *Infoworld* in Jan. 27, 1997. Additional articles documenting the lack of verification testing include "The Bug Report: Microsoft To Fix Its Fixes", which appeared on page 14 in *Infoworld*, Jan. 20, 1997; and "The Bug Report: Service Pack 2 for Windows NT 4.0 Has Many Bug Fixes", which appeared on page 35 in *Infoworld*, Jan. 27, 1997.

In the case of a specific prior art operating system, which is the product of a corporation that also develops and markets application programs, certain routines of the application program interface are left undocumented. The purpose is to implement corporate strategy for gaining an unfair advantage in the development of competing products, which are not able to exploit the functionality of undocumented routines. Developers of competing products may be able to produce the functional equivalent to undocumented routines. Even so, the performance of the functional equivalent routines will always be degraded relative to that of the undocumented routines. This is because system resources are allocated to undocumented portions of the application program whether or not they are actually utilized by the application programs. The highest number of undocumented routines in the prior art is two hundred and fifty. For further information, the reader is referred to the text book by A. Scheilman, D. Maxey, and M. Pietrek, entitled *Undocumented Windows: A Programmer's Guide to Reserved Windows API Functions*, published by Addison-Wesley.

A problem exists in the prior art in that eleven incompatible versions of an operating system for the IBM PC/AT and compatibles have been released over a ten year period with additional releases scheduled in the near future. The effect of this shotgun approach to releasing operating systems is to allow a single corporation to control the environment in which development takes place. Beta program privileges for future releases of the operating system, which in some cases require steep license fees, has created a country club atmosphere in which members are given exclusive access to operating system specifications prior to its release. Early access provides a time-to-market lead in which to initiate product development and marketing programs. Non-members are sometimes able to regain competitive status by upgrading their product line, only to find their efforts invalidated in approximately one year with the release of a subsequent, incompatible version of the aforementioned operating system.

Prior art operating systems are limited in that, the functionality of the said operating system partially determines the functionality of application programs. One such operating system is DOS, which is distributed by IBM and Microsoft Corporation using the brand name PC-DOS and MS-DOS, respectively. It has been is widely acknowledged in the prior art that DOS is insufficient for modem computer applications. Section 1.2 of the web site at http://www.cmkrnl.com/faq.html confirms this insufficiency as follows: "In primitive PC operating environment such as DOS, drivers were specific to individual applications. For example, WordPerfect got pretty successful by including drivers that supported a wide variety of printers. But none of those drivers would work with any other printers." Another limitation of the DOS operating system is that concurrent processes are unable to access the video graphics adapter through a common graphics device interface. Despite the speed and efficiency of this operating system, this particular limitation contributed to the decreased popularity of application programs written for DOS as visual programs gained wider acceptance. Visual programs produce high-resolution, color graphics displays in the form of lines, polygons, solid shapes, symbols, text, and images. For further background, see the text book by Peter Norton entitled *Programmer's Guide To IBM Personal Computers*, published by Microsoft Press in 1985, and in particular Chapter 14 entitled "DOS Basics". A case study which documents the importance of graphical programs is given in the article by Dennis J. Velazquez, entitled "Making The Switch From DOS To Windows MMI", which appeared on pages 58 and 59 of the *A-B Journal*, November 1995.

Finally, a problem exists in the prior art in that applications are restricted to interface with the operating system which do provide a graphics device interface at very high levels of abstraction in an object-oriented environment. The utility of object-oriented programming is not universal. Programs for e-mail, word processing, web browsing, spreadsheets, and computer-aided drawing are assembled much in the same way an automobile is assembled from pre-defined components. For a many applications, however, software development in an object-oriented environment is similar to writing a story given a collection of stock paragraphs. Either the story is so similar to existing stories that it is not worth writing, or it is highly unlikely that the appropriate combination of paragraphs exist to write the story. In the later case, the time required to find an appropriate combination of stock paragraphs would be prohibitively long. Applications development demands the flexibility of a programming language just as writing a good book demands the flexibility of the English language.

OBJECTS AND ADVANTAGES

The present invention aims to overcome the aforementioned and other problems and deficiencies in the prior art.

Accordingly, it is an object of the present invention to provide an improved method of interfacing concurrent processes and physical devices in a computer system without the overhead, restrictions, and complexity imposed by operating systems in the prior art.

It is another object of the present invention to provide application programs with access to physical devices using methods to minimize utilization of system resources and corresponding scheduling delays.

It is another object of the present invention to provide programming interfaces between application programs and physical devices which can be configured at runtime to optimize its performance and customize its functional behavior in order to satisfy the requirements of a diverse suite of application programs.

It is another object of the present invention to provide a programming interface between application programs and a particular physical device in use which can be combined in a mix and match way with other such programming interfaces to additional devices in order to develop new applications.

It is another object of the present invention to provide programming interfaces between application programs and physical devices that may be utilized as follows:

(a) to provide system services which are absent from the operating system;

(b) to replace operating system services in cases when the implementation of these services is inadequate;

(c) to provide a degree of functional modularity so that the operating system does not have to be rewritten in order to accommodate new application program development; and (d) to provide a degree of functional modularity so that new versions of the operating system do not invalidate existing applications.

It is another object of the present invention to provide preferred embodiments of such methods which will enhance the capability of microprocessors such as the x86 family of microprocessors manufactured by companies such as Intel, Cyrix, IBM, AMD, and IMS.

It is another object of the present invention to provide preferred methods designed for use with computers such as the IBM PC/AT which utilize the x86 family of microprocessors.

It is another object of the present invention to provide preferred embodiments of such methods that will enhance the performance and functionality of application programs running under the DOS operating system by providing programming interfaces to the 8253/8254 timer-chip and video graphics adapter.

It is another object of the present invention to provide such methods that will, in alternate preferred embodiments, schedule the duration, frequency, and phase of concurrent process activation times in order to avoid contention for system resources.

In accordance with the previous summary, objects, features and advantages of the present invention will become apparent to one skilled in the art from the subsequent description and the appended claims taken in conjunction with the accompanying drawings.

DRAWING FIGURES

In the drawings, closely related figures have the same number but different alphabetic suffixes.

FIG. 3 is a block diagram representing the programming interface between application programs and physical devices of the present invention.

FIGS. 4A to 4B are precedence graphs depicting the input-output relations, execution times, and scheduling delays associated with the process sequence which is utilized by the present invention to provide application programs with a programming interface to physical devices.

FIGS. 5A to 5R are diagrams illustrating the effect of input parameters to a function, in alternate preferred embodiments of the present invention, providing application programs running in DOS-protected mode with the capability to fill enclosed regions of the graphics display screen using one of seventeen different fill patterns.

FIG. 6 is a diagram illustrating the effect of input parameters to a function, in alternate preferred embodiments of the present invention, that provides application programs running in DOS-protected mode with text display capability.

Reference Numerals In Drawings

Figure 1:
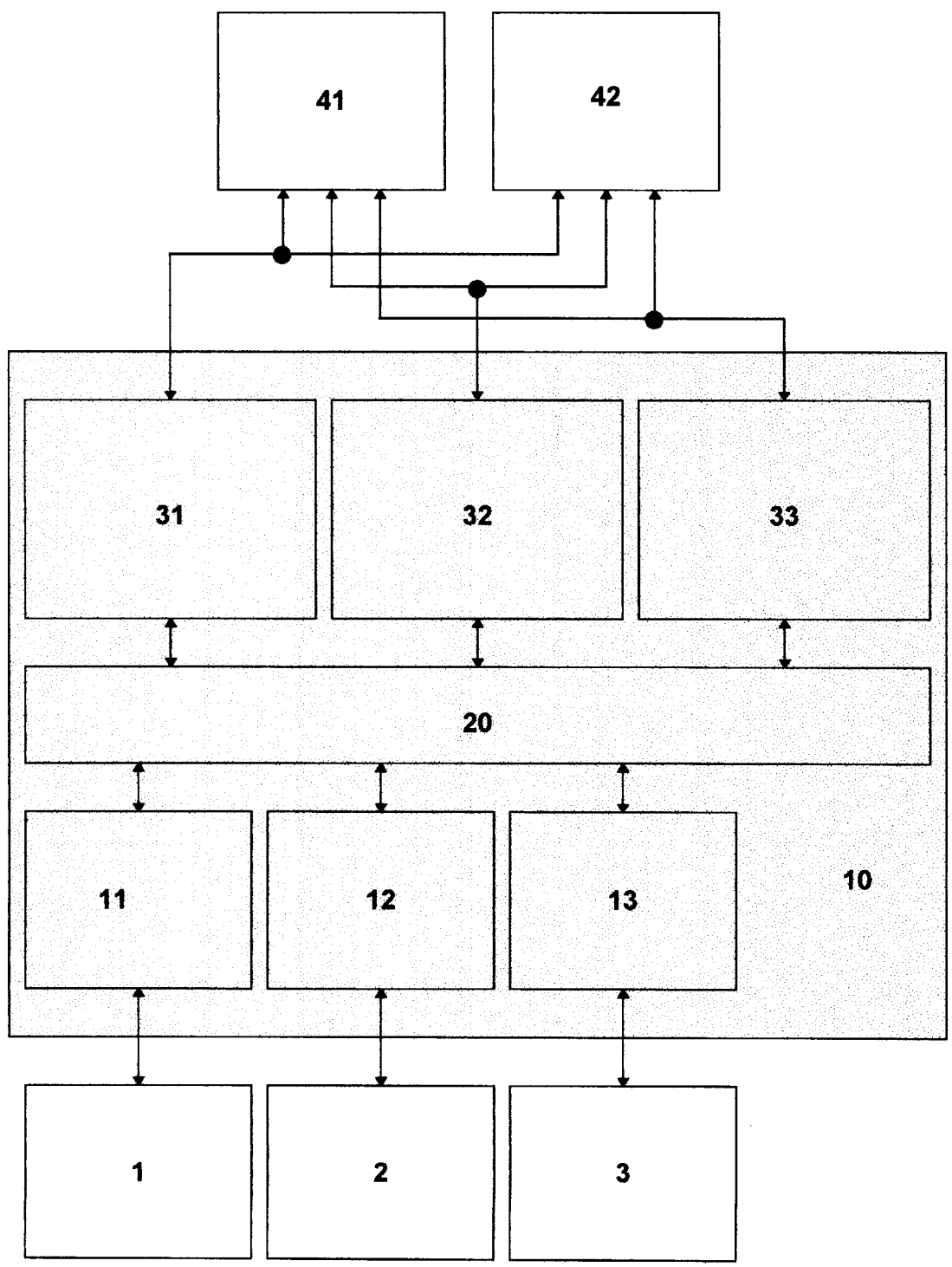
FIG. 1 is a block diagram representing a prior art programming interface between application programs and physical devices in a computer system.
Figure 2A:
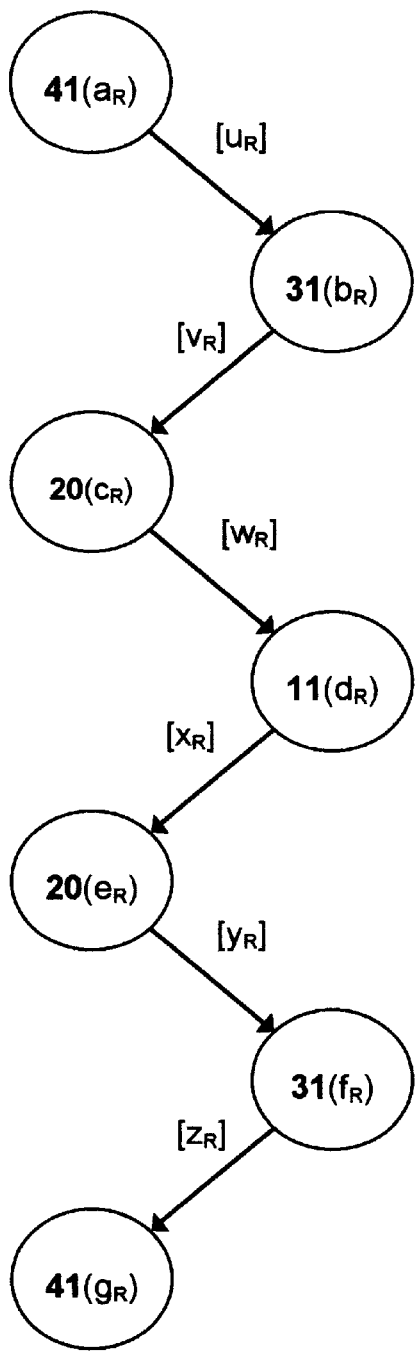
FIGS. 2A to 2B are precedence graphs depicting the input-output relations, execution times, scheduling delays associated with the process sequence which is utilized in the prior art to provide application programs with a programming interface to physical devices.
Figure 2B:
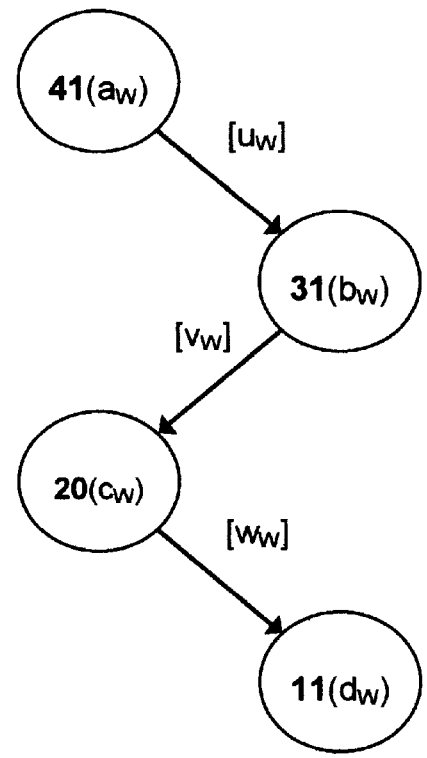

| | |
|---|---|
| 1 physical device A | 31 application program interface A |
| 2 physical device B | 32 application program interface B |
| 3 physical device C | 33 application program interface C |
| 11 operating system | 51 application program interface X |
| 11 device driver A | 52 application program interface Y |
| 12 device driver B | 53 application program interface Z |
| 13 device driver C | 61 private data X |
| 20 kernel | 62 private data Y |
| 31 application program interface A | 63 private data Z |
| 32 application program interface B | 71 library of routines X |
| 33 application program interface C | 72 library of routines Y |
| 41 application program A | 73 library of routines Z |
| 42 application program B | |

SUMMARY

In accordance with the present invention a programming interface to a physical device in a computer system comprises private data together with a library of routines which are dynamically bound to application programs, and which manipulate the physical device independently of any other process.

DESCRIPTION—FIGS. 3 TO 4

Referring to FIG. 3, two application programs 41, 42 and three physical devices 1, 2, 3 are shown. Also, three application program interfaces 51, 52, 53 of the present invention are shown.

The application program interface 51 consists of private data 61 and a set of routines 71 which expose the functionality of the physical device 1. The private data 61 influences the behavior of the library of routines. The library of routines 71 modify the private data 61 in order to record state information during periods of inactivity. The library of routines 71 respond to interrupts which may originate from the physical device 1. Furthermore, the library of routines 71 are invoked by application programs 41, 42 to perform services that require utilization of the physical device 1 and to modify the private data 61. The application program interface 51 is provided in a dynamic-link library so that the set of routines 71 may be shared between the application programs 41, 42 and utilized in conjunction with other such programming interfaces 52, 53 to additional physical devices 2, 3, respectively. Application programs 41, 42 only have to conform to the peculiarities of the library of routines 71, in terms of the method of passing data and control information, without regard to implementation details of requested services. The library of routines 71 are dynamically bound only to the application programs 41, 42 and incorporate a hardware-dependent representation of the physical devices 1. This representation is utilized to execute a sequence of actual device operations that are specific to the physical device 1 and collectively result in the completion of requested services. It can be seen that exactly one process per physical device and one level of dynamic binding is utilized to provide the programming interface 51 between application programs 41, 42 and the physical device 1.

Application program 41 must execute prior to application program interface 51 in order to request services that require reading data and status words from physical device 1. The application program interface 51 must execute prior to the application program 41 in order to provide the said service by reading data and status words which are output by physical device 1. Process input-output relationships and process execution times are represented by the precedence graph of FIG. 4A. If process 41 begins execution at time t=0 then the process sequence evolves as follows:

(a) process 41 for the period beginning at t=0 and ending at $t=p_R$;

(b) process 51 for the period beginning at $t=p_R$ and ending at $t=p_R+q_R$; and (c) process 41 for the period beginning at $t=p_R+q_R$ and ending at $t=p_R+q_R+r_R$;

It can be seen that the scheduling delay is zero since the order of process activation is determined exclusively by process sequence input-output relationships. Furthermore, the time required by the application program interface 51 to provide services that require reading data and status words from physical device 1 is deterministic since the execution times $p_R$, $q_R$, $r_R$ are deterministic.

Application program 41 must execute prior to application program interface 51 in order to request services that require writing data and control words to physical device 1. Application program interface 51 writes data and control words to physical device 1 in order to provide the said service. Process input-output relationships and process execution times are represented by the precedence graph of FIG. 4B. If process 41 begins execution at time t=0 then the process sequence evolves as follows:

(a) process 41 for the period beginning at t=0 and ending at $t=p_w$; and (b) process 51 for the period beginning at $t=p_w$ and ending at $t=p_w+q_w$. It can be seen that scheduling delays are zero since the order of process activation is determined exclusively by process sequence input-output relationships. Furthermore, the time required by the application program interface 51 to provide services that require writing data and status words to physical device 1 is deterministic since the execution times $p_w$, $q_w$ are deterministic.

The present invention is now described with reference to preferred embodiments designed for implementation in computers, such as the IBM PC and compatibles, which utilize the family of microprocessors manufactured by Intel, IBM, AMD, and Cyrix. These embodiments are given only to illustrate the general principals of the invention and are not to be taken in a limiting sense. The true scope of the invention can be ascertained by reading the appended claims.

Source code for the programming interfaces to the video graphics adapter and 8253/8254 timer-chip is listed in Appendix A and Appendix B, respectively. This source code is compiled using Borland Pascal 7.0 to produce dynamic-linked libraries GDI.DLL and TIMER.DLL. Dynamic-linked libraries provide language independent, code-sharing capability between DPMI (DOS Protected-Mode Interface) clients to include application programs and other dynamically linked libraries as per *DPMI Interface Specification* 0.9. Therefore, the procedures and functions which are exported by GDI.DLL and TIMER.DLL may be utilized by all DPMI (DOS Protected-Mode Interface) clients which are present. Furthermore, GDI.DLL and TIMER.DLL may be combined in a mix-and-match way with other such application program interfaces providing access to additional devices in a computer system.

Procedures and functions which are exported by GDI.DLL are itemized on lines 1031 to 1044 of the source code listed in Appendix A. GDI.DLL provides a programming interface between DPMI clients and video graphics adapters which utilize VESA (Video Electronics Standards Association) compliant SVGA (Super Video Graphics Adapter) chips. Procedures and functions which are exported by TIMER.DLL are itemized on lines 1230 to 1234 of the source code listed in Appendix B. TIMER.DLL provides application program interface to the 8253/8254 timer-chip.

It will become evident from a description of the operation of preferred embodiments of the present invention that GDI.DLL AND TIMER.DLL provide DPMI clients with inter-process communication capability, a scheduler, and a graphics device interface. This capability is provided using methods which require only one process and one level of dynamic binding per physical device. Furthermore, the source code is optimized for speed. The speed of the graphics device interface, for example, is indicated by image display rates equal to 1136 frames per second, 128×128 pixels per frame, using the Cyrix P166+ microprocessor with 70nsec random access memory and ATI Mach-64 video graphics adapter board running in 800×600 VESA mode. Full screen image display update rates using this hardware equal 70 and 45 images per second running in 640×480 and 800×600 VESA mode, respectively.

OPERATION—FIGS. 3, 5, 6

The client/server model identifies the manner of using the application program interface of the present invention in order to insure compatibility with mature, well-understood software development tools and methodologies in the prior art. This model advocates a layered approach to systems development. The basic goal of layering is to break up the problems involved in systems development into manageable pieces. This partition exists both on a conceptual and implementation level in that developers are able to understand the problems separately and make improvements in solutions to the different problems separately. In this model, each layer is regarded as a server that waits to be asked by clients in the layer above to provide a specific service. Servers exploit the functionality of the layer below to provide higher-level system services to clients in the layer above. Usually there is a standard interface and clients only have to conform to the peculiarities of this interface without regard to implementation details of requested services.

With reference to FIG. 3, the application programs 41, 42 and application program interfaces 51, 52, 53 interact as clients and servers, respectively, as per the aforementioned client/server model. Specifically, the application program interfaces 51, 52, 53 exploit the functionality of physical devices 1, 2, 3 in the layer below in order to provide certain services to application programs 41, 42 in the layer above.

The manner of using the application program interface to the video graphics adapter is now described with reference to Appendix A and FIGS. 5 and 6.

The function InitGraph attempts to initialize the application program interface to the video graphics adapter and returns an integer indicating the success or failure of the initialization. Input parameter PathToFiles is the name of the directory containing initialization files 'C', 'A', 'L', and 'F'. Input parameter Mode selects the spatial resolution of the graphics display. The procedure TermGraph terminates the application program interface to the video graphics adapter.

The procedure SetPalette updates a palette which is initialized and maintained by the graphics device interface with a new color. The palette is a table which associates 256 color indices with points in red-green-blue color space. A pixel on the graphics screen may be set to a given color by specification of the color index, which may be viewed as a cross-reference to that color in the palette. Similarly, drawing colors are specified using the color index. Drawing colors include a foreground, background, and fill colors. Text is drawn using the current foreground color. Symbol contours, lines, and polygons are drawn using a combination of the current foreground and background colors. Arbitrarily shaped regions are filled using a combination of the current fill and background colors. SetPalette input parameters Red, Green, and Blue are the relative intensities of the red, green, and blue components of a color, respectively, on a scale of 0 to 63. Input parameter Index is the corresponding color index. For example, SetPalette(0,0,0,0) and SetPalette(8,63, 33,0) associate color index values 0 and 8 with black and orange, respectively.

The procedure SetBackColor sets the background color for subsequent drawing until reset. Input parameter Index selects the background color from one of the colors in the palette.

The procedure SetForeColor sets the foreground color for subsequent drawing until reset. Input parameter Index selects the foreground color from one of the colors in the palette.

The procedure SetLineStyle sets a line style for subsequent drawing until reset. Input parameter Style is a 16-bit word whose bit pattern specifies the sequence of foreground and background colors which are used to draw points on a line. For example, if the current line style equals FFFF (hexidecimal) and 0000(hexidecimal) then solid lines are drawn in the current foreground and background colors, respectively. If the current line style equals 5555 (hexidecimal) or AAAA(hexidecimal) then points on the line alternate between these two colors.

Regions enclosed by boundary points are drawn using a fill pattern. The fill pattern consists of a background color, fill color, and spatial pattern of binary pixels obtained by thresholding a dither matrix using the fill style. The relationship between the dither matrix, fill pattern, and fill style is shown by FIGS. 5A to 5R. If a pixel at horizontal and vertical location x and y, respectively, coincides with the region to be filled, then it is set to the background color if the current fill style is less than or equal to D(x mod 4, y mod 4), where D(i,j) is the dither matrix with elements given by FIG. 5A. Otherwise, the interior pixel is set to the fill color. The fill style is an integer greater than or equal to 0 and less than or equal to 16. The relationship between fill style and fill pattern is illustrated by FIGS. 5B to 5R. The procedure SetFillStyle sets the current fill style used for subsequent drawing until reset. Input parameter Style is the fill style. The procedure SetFillColor sets the fill color for subsequent drawing until reset. Input parameter Index specifies the fill color from the palette.

The procedure SetTextStyle sets a text style which is used for subsequent drawing until reset. The text style is a 16-bit word which specifies the text font, orientation, justification, and character spacing. SetTextStyle input parameter TextStyle specifies the text style. TextStyle bits 0–7 select one of eight different text fonts. With reference to FIG. 6, TextStyle bits 10–11 and 12–13 select text justification in the direction parallel and perpendicular to text direction. The constants JustifyLeft, JustifyCenter, and JustifyRight are used to select text justification in the direction parallel to text orientation. The constants JustifyTop, JustifyMiddle, and JustifyBottom determine text justification in the direction perpendicular to text orientation. Input parameter TextStyle bits 14–15 select the method of spacing adjacent characters centers in the direction parallel to character orientation. These methods include proportional or non-proportional character spacing. The effect of proportional character spacing is to pack the text display in the smallest possible area since the distance between adjacent character centers in the direction parallel to character orientation is proportional to character width. The effect of non-proportional character spacing is to arrange character centers on a regular, two-dimensional array of points. In this case, the distance between adjacent character centers in the direction parallel to character orientation is constant and does not vary with character width.

The procedure WriteText draws a text string. Input parameter Message is the text which is drawn using the current text style and foreground color. Input parameters X and Y are the horizontal and vertical location of a reference point on the graphics screen, respectively. The relationship between text location and orientation relative to this reference point and the current text justification and direction is illustrated by FIG. 6. In this Figure, the location of the reference point is indicated by the intersection of the dashed lines.

The procedure GetTextDimen gets the height and width of a text string drawn in the current text style. Input parameter Message is the text string of interest. Output parameters Width and Height are the horizontal and vertical text string dimensions in pixels, respectively.

The procedure SetGraphParam sets the current text style, line style, fill style, and drawing colors used for subsequent drawing until reset. Input parameter Param is a record of type GraphParameters with data fields consisting of the current foreground color, background color, fill color, line style, fill style, and text style. The procedure GetGraphParam gets the current text style, line style, fill style, and drawing colors. Output parameter Param is a record of type GraphParameters. If two or more scheduled processes update the display screen by changing graphics parameters, then these processes may need to save and restore the graphics parameters using GetGraphParam and SetGraphParam, respectively.

The function GetForeColor, GetBackColor, and GetFillColor returns the color index of the current foreground, background, and fill colors, respectively.

The procedure GetScreenDimen gets the spatial resolution of the graphics screen. Output parameters Width and Height are the horizontal and vertical screen dimensions in pixels, respectively.

The procedure BitBit combines the pixels in a window, defined as any rectangular region on the graphics screen, with the contents of the pixels stored in a buffer array using logical operators. The buffer array is a contiguous region of random access memory which stores the pixels in raster scan fashion. Input parameters X and Y are the horizontal and vertical coordinates of the upper left-hand corner of the window, respectively. Input parameters Width and Height are the horizontal and vertical window dimensions, respectively. Boolean input parameter ExOr determines if the logical operation used to combine pixels in the window and buffer array is XOR or AND. Input parameter BufPtr is a pointer to the buffer array.

The procedure ReadPicture copies the pixels in a window to a corresponding pixels in a buffer array. Input parameters X and Y are the horizontal and vertical coordinates of the upper left-hand corner of the window, respectively Width and Height are the horizontal and vertical dimensions of the window, respectively. Input parameter lmgPtr is a pointer to the buffer array.

The procedure WritePicture copies the pixels in a buffer array to corresponding pixels in a window. Input parameters X and Y are the horizontal and vertical coordinates, respectively, of the upper left-hand corner of the window. Width and Height are the horizontal and vertical dimensions, respectively. Input parameter lmgPtr is the pointer to the buffer array.

The function ReadPixel reads a pixel from the graphics screen. Input parameters X and Y are the horizontal and vertical coordinates of the pixel, respectively. ReadPixel returns the color index which was used to draw the pixel.

The procedure WritePixel writes a pixel to the graphics screen. Input parameters X and Y are the horizontal and vertical coordinates of the pixel, respectively. Input parameter Index is the color index which is used to draw the pixel.

The procedure FillScreen sets the entire background screen to a single color. Input parameter Index is the color index which is used to draw each pixel on the graphics screen.

The procedure MoveScreen pans and scrolls the entire graphics display by redefining its origin relative to the physical graphics screen. Input parameters X and Y are the horizontal and vertical coordinates, respectively, of the pixel which appears in the upper-left-hand corner of the graphics display screen after execution of MoveScreen.

The procedure MoveWindow pans and scrolls all pixels inside a window. Input parameters X and Y are the horizontal and vertical coordinates of the upper left-hand corner of the window, respectively. Input parameters Width and Height are the horizontal and vertical window dimensions, respectively. Input parameters dX and dY are the number of pixels in which to move the window in the horizontal and vertical directions, respectively. The new location of the upper left-hand corner of the window after panning and scrolling is given by horizontal and vertical coordinates X+dX and Y+dY, respectively.

The procedure WriteLine draws a line specified by its endpoints using the current line style, foreground color, and background color. Input parameters X0 and Y0 are the horizontal and vertical coordinates of the first endpoint of the line, respectively. Input parameters X1 and Y1 are the horizontal and vertical coordinates of the second endpoint of the line, respectively.

The procedure WriteRectangle draws a rectangle consisting of four lines which are drawn in the current foreground color, background color, and line style. Input parameters X0 and Y0 are the horizontal and vertical coordinates of the upper left-hand corner of the rectangle, respectively. Input parameters X1 and Y1 are the horizontal and vertical coordinates of the lower right-hand corner of the rectangle, respectively.

The procedure WriteCircle draws a circle specified by its radius and center using the current foreground color. Input parameters X and Y are the horizontal and vertical coordinates of the circle center, respectively. Input parameter R is the radius of the circle. Input parameter Fill determines if the area enclosed by the circle is filled using the current fill pattern.

The procedure WriteCross draws a cross specified by its location and size using the current foreground color and line style. Input parameters X and Y are the horizontal and vertical coordinates of the center of the cross, respectively. Input parameter Size determines the size of the cross.

The procedure WriteCrossHairs draws crosshairs specified by its location and size using the current foreground color and line style. Input parameters X and Y are the horizontal and vertical coordinates of the center of the crosshairs, respectively. Input parameter Size determines the size of the crosshairs.

The procedure WriteDiamond draws a diamond specified by its location and size using the current foreground color and line style. Input parameters X and Y are the horizontal and vertical coordinates of the center of the diamond, respectively. Input parameter Size determines the size of the diamond. Input parameter Fill determines if the area enclosed by the diamond is filled using the current fill pattern.

The procedure WriteStar draws a star specified by its location and size using the current foreground color and line style. Input parameters X and Y are the horizontal and vertical coordinates of the center of the star, respectively. Input parameter Size determines the size of the star.

The procedure WriteWye draws the letter "Y" specified by its location and size using the current foreground color and line style. Input parameters X and Y are the horizontal and vertical coordinates of the center of the letter "Y", respectively. Input parameter Size determines the size of the letter "Y".

The procedure WriteSymbol draws a symbol specified by its location, size, and index using the current foreground color, background color, fill color, and line style. Input parameters X and Y are the horizontal and vertical coordinates of the center of the symbol, respectively. Input parameter Size determines the size of the star. Possible symbols which are selected by input parameter Spec include a point, star, cross, crosshairs, diamond, rectangle, circle, triangle, solid diamond, solid rectangle, solid circle, and the letter "Y".

The procedure WritePolygon draws a bar graph or polygon using the current drawing colors and fill style. Polygons may be drawn a symbol at each vertex of the polygon. Also, lines may be used to connect adjacent pairs of vertices. The procedure WriteSymbol is called by WritePolygon to draw a symbols at each vertex if input parameter Spec is greater than 1, in which case Spec and input parameter Size determine the symbol drawn at each vertex and its size, respectively. Input parameter Cnt is the length of the polygon or number of vertices. If input parameters Yb equals 1 then vertices are connected with lines using the current foreground color, background color, and line style. If input parameter Yb is greater than 1 then a bar graph is drawn using the current fill color, background color, and fill style where Yb is taken as the vertical position of the horizontal axis. If input parameter Yb equals 0 then only symbols are drawn at each vertex if Spec is greater than 1. Input parameter Poly is an array of polygon vertices.

The procedure FillBoundary fills the area enclosed by a polygon using the current fill pattern. Input parameters X and Y are the horizontal and vertical coordinates of any point inside the polygon, respectively. Input parameter Edge is the color index of the polygon boundary points.

The procedure UpdatePolygon updates a fixed-length polygon and corresponding display with a new data point. In many applications polygons represent a windowed sequence of numbers which evolve in time at fixed measurement update intervals. When an additional number of a windowed sequence that was previously drawn using WritePolygon becomes available, UpdatePolygon may be used to update the numbers inside the window and display the result. Input parameter Y is the new data point. The procedure WriteSymbol is called by WritePolygon to draw a symbols at each vertex if input parameter Spec is greater than 1, in which case Spec and input parameter Size determine the symbol drawn at each vertex and its size, respectively. Input parameter Cnt is the length of the polygon or number of vertices. If input parameters Yb equals 1 then vertices are connected with lines using the current foreground color, background color, and line style. If input parameter Yb is greater than 1 then a bar graph is drawn using the current fill color, background color, and fill style where Yb is taken as the vertical position of the horizontal axis. If input parameter Yb equals 0 then only symbols are drawn at each vertex if Spec is greater than 1. Input parameter Poly is an array of polygon vertices.

The procedure WriteBar draws a solid, rectangular region using the using the current fill pattern. Input parameters X0 and Y0 are the horizontal and vertical coordinates of the upper left-hand corner of the bar, respectively. Input parameters X1 and Y1 are the horizontal and vertical coordinates of the lower right-hand corner of the bar, respectively.

The procedure WriteTag draws a tag consisting of a text string superimposed on a bar which is large enough to enclose the text string. Input parameter TagStr is the text string. Input parameters PosX and PosY are the horizontal and vertical location of the center of the bar, respectively. Boolean input parameter Border enables drawing of the bar perimeter using the color indexed by input parameter Fore. Input parameter Justify determines the justification of the text string relative to the four edges of the bar. Input parameters Fore and Back select the color in which the text string and bar are drawn from the colors in the palette, respectively.

The procedure WriteTriangle draws a triangle specified by three vertices using the current line style, fill style, and foreground, background, and fill colors. Input parameters X0 and Y0 are the horizontal and vertical coordinates, respectively, of the first vertex of the triangle. Input parameters X1 and Y1 are the horizontal and vertical coordinates, respectively, of the second vertex of the triangle. Input parameters X2 and Y2 are the horizontal and vertical coordinates, respectively, of the third vertex of the triangle. Input parameter Fill enables filling the interior of the triangle using the current fill pattern.

The manner of using the application program interface to the 8253/8254 timer-chip is now described with reference to Appendix B.

The Intel 8253/8254 timer-chip consists of a timer-register, timer-counter, and time-base oscillator. The 16-bit timer-counter is continually decremented by the time-base oscillator at a rate of 1193180 Hz. Two events coincide with each timer-counter transition from 1 to 0. First, the timer-counter is reset by the 8253/8254 timer-chip using the contents of the timer-register. Second, a timer-tick interrupt is generated by the 8253/8254 timer-chip which activates a timer-tick interrupt procedure. The timer-tick interrupt procedure is the interrupt service routine with hardware interrupt vector number equal to 8. Effectively, the timer-register down converts the time-base oscillator frequency to determine the timer-tick interrupt rate, which is equal to 1193180 divided by the contents of the timer-register in Hz. The function InitScheduler initializes the application program interface to the 8253/8254 timer-chip by setting the timer-register value, creating a process descriptor list, saving the original timer-tick interrupt procedure, and directing timer-tick interrupts to interrupt procedure UpdateScheduler. The process list records information corresponding to each process which is managed by the application program interface to the 8253/8254 timer-chip. UpdateScheduler utilizes information contained in the process list in order to control process duration and activation times. InitScheduler writes input parameter RegValue to the timer-register in order to establish the scheduler interrupt rate. The scheduler interrupt rate equals 1193180/RegValue in Hz. Also, InitScheduler input parameter RefValue sets the frequency of a phase reference signal. The phase reference signal occurs every RefValue timer-tick interrupt or RefValue×RegValue/1193180 seconds, and is utilized to control the phase of process activation times in order to avoid contention for system resources.

The procedure TermScheduler terminates the application program interface to the 8253/8254 timer-chip and directs timer-tick interrupts to the original timer-tick interrupt procedure.

The procedure GetSchedParam gets the timer-register value and phase reference interval. Output parameter RegValue is the 8253/8254 timer-register value which determines the timer-tick interrupt rate. Output parameter RefValue is the phase reference interval.

The function GetTimerTicks returns the number of timer ticks modulo 65536 to provide a time reference which is incremented at a rate equal to the timer-tick interrupt rate.

The procedure GetProcList gets the process descriptor list. Output parameter NumPtr is a pointer to an integer equal to the number entries in the process descriptor list. Output parameter ListPtr is a pointer to the process descriptor list, which is declared in the source code as an array of process records. Process record data field VectNum is the software interrupt vector number of a process activation procedure. The process activation procedure is an interrupt procedure of type ActvProcedure, declared on line 1040 of the source code, which is utilized by UpdateScheduler to initiate process execution. Activated processes remain in a current state of execution until the activation procedure terminates, in which case the process enters a suspended state of execution. Process record data field CommProc is the starting address a process communication procedure. The communication procedure is a procedure of type CommProcedure, declared on line 1041 of the source code, which is utilized by the process to receive messages sent from other processes. Process record data field DescPtr is a pointer to private memory which may be utilized by the process to record a set of state variables. State variables may be utilized to customize the process for a particular application by defining and controlling the process runtime behavior. It can be seen that it is possible to create multiple processes with different runtime behavior using a single process activation procedure if the parameters which initialize process state variables are unique. Process record data field OkToRun determines if scheduled process activity is enabled or disabled. Disabled processes are ignored by UpdateScheduler until subsequently enabled. Process record data fields EventToGo, ActPeriod, and ActPhase control the number, frequency, phase of enabled process activation times. Process record data field TicksToGo is the number of timer-tick interrupts remaining until process activation. If the process is enabled, UpdateScheduler decrements the TicksToGo field in response to timer-tick interrupts. Coinciding with each TicksToGo transition from 1 to 0, EventToGo is decremented if its value is not equal to 65536. Furthermore, the process activation procedure is executed and TicksToGo is set to ActPeriod if the decremented value of EventToGo is greater than 0. If EventToGo equals 0, the processes is terminated and removed from the process descriptor list. Just as the timer-register down converts time-base oscillator frequency to determine the timer-tick interrupt rate, ActPeriod down converts the timer-tick interrupt rate to determine the activation procedure interrupt rate. It can be seen that process activation frequency equals the timer-tick interrupt frequency divided by ActPeriod. Initial execution of the process activation procedure is delayed until the number of timer-tick interrupts which occur after generation of the phase reference signal equals ActPhase. It can be seen that process activation phase equals ActPhase divided by one over the timer-tick interrupt frequency.

The procedure DisableScheduler disables the scheduled activation of all processes until subsequently enabled or the scheduler is terminated.

The procedure EnableScheduler resumes the scheduled activation of all processes if currently disabled.

The function SchedProcess schedules the activity of a process specified by its activation procedure and process descriptor, and the period, phase, and duration of its activation times. SchedProcess returns a process identification number which uniquely identifies the process. Input parameters DscPtr, Count, Period, Phase, and Enable initialize data fields DescPtr, EventToGo, ActPeriod, ActPhase, and Enable, respectively, of an available process record in the process descriptor list. Furthermore, the number of entries in the process descriptor list is increased by 1. Input parameter IntPtr is the starting address of the process activation procedure. The application program interface to the 8253/8254 timer-chip communicates with a given process at the time of its activation by setting activation procedure input parameters AX, BX, CX, SI, DI as follows:

(a) AX is the timer-tick interrupt count modulo 65536;

(b) BX is the process identification number equal to process record data field VectNum;

(c) CX is the current value of EventToGo which is equal to the number of timer-ticks until process termination;

(d) SI and DI is are the segment and offset address of DscPtr.

Interleaving the execution times of multiple processes by controlling their phase relative to each other serves to smooth microprocessor loading and avoid contention. Input parameter Count may be used to create precision countdown timers and alarms.

The procedure RemoveProcess terminates a process. Input parameter ProcId is the process identification number.

The procedure EnableProcess enables the scheduled activation of a single process until subsequently disabled or the scheduler is terminated. Input parameter ProcId is the process identification number.

The procedure DisableProcess disables the scheduled activation of a single process until subsequently enabled by EnableProcess. Input parameter ProcId is the process identification number.

The procedure SetCommProc associates a process which is listed in the process list with a procedure which handles interprocess communication of data and/or control information. Input parameter ProcId is the process identification number. Input parameter CommProc is the starting address of the process communication procedure. Communication procedures accept as an input five parameters. Communication procedure input parameter Src is the process identification number of the sender. Communication procedure input parameter Code is an application specific control word determined by the sender. Communication procedure input parameter DscPtr is a pointer to the private memory of the receiver process. Communication procedure input parameter Size is the length of a data buffer created by the sender, and DatPtr is the pointer to that data buffer.

The function SendPacket sends a variable length packet to a specific process. Input parameter Src is the identification number of the process which creates the packet and subsequently calls SendPacket. Input parameter Dst is the process identification number of the packet destination. Input parameter Code is the application specific control word determined by the sender. Input parameter Size is the length of a data buffer created by the sender. Input parameter DatPtr is the pointer to this data buffer. If Dst corresponds to a currently scheduled process, SendPacket invokes the communication procedure associated with the destination process and returns TRUE. Otherwise, SendPacket returns FALSE.

SUMMARY, RAMIFICATIONS, AND SCOPE

Thus the reader will see that application program interface of the present invention provides a programming interface between application programs and a physical device in a computer system. The application program interface consists of private data and of a library of routines which are dynamically bound to application programs. The library of routines may be utilized in a mix-and-match way with each other and also the library of routines provided by other such programming interfaces to additional devices. Furthermore, the library of routines of the programming interface perform hardware-dependent manipulation of the physical device in order to expose its functionality in a manner which minimizes utilization of computer resource and maximizes speed of execution. In contrast to the prior art, a single level of dynamic binding is utilized to provide the programming interface of the present invention.

Preferred embodiments of the present invention enhance the capabilities of the IBM personal computer and compatibles, and provide convincing evidence regarding the significant advantages of the present invention relative to the prior art. The preferred embodiments include application program interfaces which expose the functionality of the 8253/8254 timer-chip and VESA-compatible video graphics adapter chips. Collectively, these application program interfaces provide thread scheduling services, inter-process communication, and a graphics device interface to DPMI clients while utilizing less than 20 and 1.1 Kbytes of program and data memory, respectively. This capability enables the development of a diverse suite of visual programs which exploit the language-independent, code-sharing capability of dynamically linked libraries without the restrictions, complexity, and overhead of operating systems in the prior art. Program memory requirements of the Windows 3.11 operating system components providing access to the video graphics adapter and 8253/8254 timer-chip is not disclosed, but is approximated by the sum the files GDI.EXE, KERNEL.EXE, VGA.DRV, and TIMER-.DRV. The sum of these files is equal to 375 Kbytes, which is at least 18 times greater than the program memory requirements of the programming interfaces of the present invention.

The programming interface of the present invention does not reflect the requirements of any particular set of applications or model of computing. This type of functional modularity protects investment in the development of applications software, effectively allowing programmers to focus their energies on the parts of new applications development which are unique instead of the parts which are common to a variety of applications, and businesses to leverage baseline software technologies in order to penetrate new markets.

The reader will recall that in 1985 Microsoft published a book stating that two or more application programs running under DOS are unable to share video hardware through a common graphics device interface. This capability is provided by the programming interface to the video graphics adapter of the present invention. Furthermore, the performance of this programming interface is unprecedented in the prior art. Running in 800×600 VESA mode on the Cyrix P166+ microprocessor with 70nsec random access memory and the ATI Mach-64 video graphics adapter, the execution time required to update a 128×128 pixel image display is less than 88 $\mu$sec. With reference to the Quake Frame Rate Benchmark List, which is posted on the World Wide Web at http://www.cam.org/~agena/quake.html#version, full screen image update rates permitted by the programming interface of the present invention are 5.2 and 4.6 times faster than that achieved in the prior art using the Cyrix P166+ in combination with any graphics video adapter running in 640×480 and 800×600 VESA mode, respectively.

Concurrent process duration, frequency of occurrence, and phase are individually programmable by the programming interface to the 8253/8254 timer-chip of the present invention. This innovative feature allows designers to:

(a) develop and validate application programs with deterministic execution and response times;

(b) develop timelines that eliminate the need for elaborate schemes to synchronize the activity of concurrent processes;

(c) interleave concurrent process execution times in order to avoid contention for shared resources in a computer system;

(d) implement timing services to include synchronous alarms, clocks, timers, and delay functions; and (e) generate time stamps with better than 1 $\mu$sec accuracy. Time stamp accuracy is independent of the scheduler update interval which is programmable from 18.2 Hz to 9.94 KHz.

While my above description contains many specificities, these should not be construed as limitations on the scope of the invention, but rather as an exemplification of preferred embodiments thereof. Many other variations are possible. For example, a programming interface of the present invention may be utilized to expose the functionality of additional devices which may be present in a computer system, such as a printer, modem, sensor data acquisition board, or digital signal processor. The source code implementing preferred embodiments of the present invention can be modified to improve its performance, to provide a programming interface to improved versions of the physical device, or to provide an interface to similar devices. For example, the source code of the present invention may be modified according to *DPMI Interface Specification* 1.0 and compiled using the TMT Pascal compiler for DOS, available from TMT Development Corporation, in order to optimize the performance of applications running on 32-bit microprocessors. In another example, the application program interface which permits the development of visual programs can be modified to interface to video graphics adapters which utilize the family of non-VESA compatible SVGA chips from manufacturers such as Ahead, ATI, Chips and Technology, Cirrus, Compaq, Everex, Genoa, NRC, OAK, Paradise/Western Digital, S3, Trident, TSENG, and Video 7.

Accordingly, the scope of the invention should be determined not by the embodiments illustrated, but by the appended claims and their legal equivalents.

Appendix A

Table 1: 16-Bit Graphics Device Interface Source Code

```
0000   library Gdi; {$F+}
0001   {* Copyright (c) 1997 Interstate Robotics, Incorporated. All rights reserved. *}
0002
0003   uses Dos,Crt,Dpmi;
0004
0005   const
0006      Res0640x0400  = 0;     Res0640x0480  = 1;    Res0800x0600  = 2;    Res1024x0768 = 3;
0007      Res1280x1024  = 4;     GraphSysOn    = 0;    NotVesa       = 1;    MemTooSmall  = 2;
0008      NoSuchFile    = 3;     NoSuchMode    = 4;    EmptyFill     = 0;    SolidFill    = 16;
0009      MaxPolySize   = 1024;  BlackF        = 0;    DarkGrayF     = 1;    LightGrayF   = 2;
0010      DirtyWhiteF   = 3;     OffWhiteF     = 4;    WhiteF        = 5;    BlueF        = 6;
0011      GreenF        = 7;     CyanF         = 8;    RedF          = 9;    PaleBlueF    = 10;
0012      LightBlueF    = 11;    LightCyanF    = 12;   LightRedF     = 13;   YellowF      = 14;
0013      LightGreenF   = 15;    DarkYellowF   = 16;   AmberF        = 17;   TanF         = 18;
0014      RedGrayF      = 19;    AquaF         = 20;   OrangeF       = 21;   WarmRedF     = 22;
0015      FirstGrayF    = 23;    LastGrayF     = 86;   FirstColorF   = 0;    LastColorF   = 22;
0016      NoSymbolF     = 0;     StarF         = 1;    CrossHairF    = 2;    CrossF       = 3;
0017      WyeF          = 4;     DiamondF      = 5;    DiamondFillF  = 6;    BarF         = 7;
0018      RectangleF    = 8;     CircleF       = 9;    CircleFillF   = 10;   TriangleF    = 11;
0019      TriangleFillF = 12;    PointF        = 13;   ShadesOfGray  = 64;   FullBlackF   = 23;
0020      FullWhiteF    = 86;    TinyFont      = 1;    ThinFont      = 2;    TagFont      = 3;
0021      SysFont       = 4;     PicaFont      = 5;    DigiFont      = 6;    BoldFont     = 7;
0022      SansFont      = 8;     FirstFont     = 1;
0023      JustifyLeft   = $0100; JustifyRight  = $0200; JustifyCenter = $0300;
0024      JustifyTop    = $0400; JustifyBottom = $0800; JustifyMiddle = $0C00;
0025      VertText      = $1000; HorizText     = $2000; TableText     = $4000;
0026      PackedText    = $8000; FontStyleMask = $000F; FontHorMask   = $0300;
0027      FontVerMask   = $0C00; FontDirMask   = $3000; FontSpaceMask = $C000;
0028      MaxFontWidth  = 16;    MaxFontHeight = 20;
0029   type
0030      pByte = ^Byte; pChar = ^Char; pInteger = ^Integer; pWord = ^Word;
0031      PolyPoint = Record LocX,LocY: Integer; end;
0032      ModeItem  = Record AxReg,BxReg,HorRes,VerRes,MemReq: Word; end;
0033      GraphParameters = Record
0034         ForeIndex,BackIndex,FillIndex,LineStyle,FillStyle,TextStyle: Byte;
0035         end;
0036      CharMap   = Array[0..MaxFontHeight] of Word;
0037      CharMask  = Record MinX,MinY,MaxX,MaxY,Skip,Diff: Integer; Char: CharMap; end;
0038      PolygonArray = Array[1..MaxPolySize] of PolyPoint;
0039      ModeTable    = Array[Res0640x0400..Res1280x1024] of ModeItem;
0040      ModeFile     = File of ModeTable;          ModeTablePointer = ^ModeTable;
0041      FontArray    = Array[0..255] of CharMask; FontPointer      = ^FontArray;
0042      FontFile     = File of FontArray;
0043      DitherLine   = Array[0..3] of Byte;
0044      DitherMatrix = Array[0..3] of DitherLine;
0045      ModifiedRegisters = Record
0046         EDI,ESI,EBP,RESERVED,EBX,EDX,ECX,EAX : LongInt;
0047         FLAGS,ES,DS,FS,GS,IP,CS,SP,SS        : Word;
0048         end;
0049   const
0050      ForeColor : Byte = 0; BackColor  : Byte = 5;    FillColor    : Byte = 5;
0051      DitherNum : Byte = 0; TextMask   : Word = 0;    LineMask     : Word = $FFFF;
0052      CurrBank  : Word = 0; MemorySize : Word = 256;  CurrRecNo    : Word = $FFFF;
0053      BaseBank  : Word = 0; NumCol     : Word = 640;  BytesPerScan : Word = 80;
0054      VideoMode : Word = 0; NumRow     : Word = 480;  GranMinusOne : Word = 0;
0055      PageSize  : Word = 0; BankSize   : LongInt = $10000;
0056      FillBytes : DitherMatrix = (($01,$01,$01,$01),
0057      ($01,$01,$01,$01),($01, $01, $01, $01),($01, $01, $01, $01));
0058   var
0059      OrigMode : Word;   OrigAttr : Byte;   FontPtr  : FontPointer;
0060      FontOff  : Word;   FontJust : Word;   CurrText : Word;
0061      VertFont : Boolean; FontFil : FontFile; ModeInfo : ModeTablePointer;
0062      SqezText : Boolean;
0065   procedure DosRealIntr(IntNo: Word; var ModRegs: ModifiedRegisters);
0066   var P: Pointer;
0067   begin
0068   Move(ModRegs,RealModeRegs,SizeOf(RealModeRegs)); P:=Addr(RealModeRegs);
0069   asm MOV AX,0300h; MOV BX,IntNo; MOV BH,00h; MOV CX,0; LES DI,P; INT 31h end;
0070   Move(RealModeRegs,ModRegs,SizeOf(ModifiedRegisters));
0071   end;
0072
0073   procedure AddMode(Mode,BX: Word);
0074   begin with ModeInfo^[Mode] do begin AxReg:=$4F02; BxReg:=BX; end; end;
0075
```

```
0076 function InitHandle(PtrHigh,PtrLow: Word): LongInt;
0077 var Handle : LongInt; Hi,Lo,CW,DW: Word;
0078 begin
0079 Hi:=PtrHigh; Lo:=PtrLow;
0080 asm
0081 MOV DX,Hi; MOV CX,4; XOR AX,AX; @@More: SHL DX,1; RCL AX,1; LOOP @@More;
0082 ADD DX,Lo; ADC AX,0; MOV CX,AX; MOV CW,CX; MOV DW,DX;
0083 end;
0084 Handle:=CW; Handle:=(Handle SHL 16); Inc(Handle,DW); InitHandle:=Handle;
0085 end;
0086
0087 function DetectIfVesa: Boolean;
0088 type
0089    pInteger     = ^Integer;
0090    VesaInfoBlock = Record
0091       Signature    : LongInt; uChipVersion : Byte;
0092       lChipVersion : Byte;    OEMStringPtr  : Pointer;
0093       Capabilities : LongInt; ModePtrLow    : Word;
0094       ModePtrHigh  : Word;    SizeOfMemory  : Word;
0095       Padding      : Array[19..256] of Byte;
0096       end;
0097 var
0098    Handle    : LongInt;  Segment   : Word; VesaInfo : ^VesaInfoBlock;
0099    dSelector : Word;     pSelector : Word; ModRegs  : ModifiedRegisters;
0100    ListPtr   : pInteger; RetCode   : Word;
0101 begin
0102 Handle:=GlobalDosAlloc(256); Segment:=(Handle AND $FFFF0000) SHR 16;
0103 dSelector:=Handle AND $0000FFFF; VesaInfo:=Ptr(dSelector,0);
0104 FillChar(ModRegs,SizeOf(ModRegs),0);
0105 with ModRegs do
0106    begin EAX:=$4F00; ES:=Segment; DosRealIntr($10,ModRegs); RetCode:=EAX; end;
0107 with VesaInfo^ do if ((RetCode=$004F) AND (Signature=$41534556)) then
0108    begin
0109    MemorySize:=SizeOfMemory SHL 6; Handle:=InitHandle(ModePtrHigh,ModePtrLow);
0110    pSelector:=AllocSelector(0); RetCode:=SetSelectorBase(pSelector,Handle);
0111    RetCode:=SetSelectorLimit(pSelector,$FFFF); ListPtr:=Ptr(pSelector,0);
0112    while (ListPtr^>=0) do
0113       begin
0114       case ListPtr^ of
0115          $0100: AddMode(Res0640x0400,$0100);
0116          $0101: AddMode(Res0640x0480,$0101);
0117          $0103: AddMode(Res0800x0600,$0103);
0118          $0105: AddMode(Res1024x0768,$0105);
0119          $0107: AddMode(Res1280x1024,$0107);
0120          end;
0121       Inc(ListPtr);
0122       end;
0123    DetectIfVesa:=True;
0124    end;
0125 RetCode:=GlobalDosFree(dSelector); RetCode:=FreeSelector(pSelector);
0126 end;
0127
0128 procedure InitVesa;
0129
0130 type
0131    VesaModeBlock = Record
0132       Unused0    : LongInt; Granularity : Word; Unused1 : Word;
0133       Unused2    : Word;    Unused3     : Word; Unused4 : Pointer;
0134       ScanLength : Word;    Reserved    : Array[0..237] of Byte;
0135       end;
0136 var
0137    Handle   : LongInt; Segment  : Word; ModRegs  : ModifiedRegisters;
0138    Selector : Word;    RetCode  : Word; VesaMode : ^VesaModeBlock;
0139 begin
0140 Handle:=GlobalDosAlloc(256); Segment:=(Handle AND $FFFF0000) SHR 16;
0141 Selector:=Handle AND $0000FFFF; VesaMode:=Ptr(Selector,0);
0142 FillChar(ModRegs,SizeOf(ModRegs),0);
0143 with ModRegs do
0144    begin
0145    EAX:=$4F01;   ECX:=ModeInfo^[VideoMode].BxReg;
0146    ES:=Segment; DosRealIntr($10,ModRegs);
0147    end;
0148 with VesaMode^ do
0149    begin
0150    if (ScanLength<>0) then BytesPerScan:=ScanLength;
0151    GranMinusOne:=64 div Granularity; Dec(GranMinusOne);
0152    end;
0153 RetCode:=GlobalDosFree(Selector);
```

```
0154  end;
0155
0156  procedure SetVideoBank(BankNo: Word);
0157  var Temp : Word;
0158  begin
0159  CurrBank:=BankNo; Inc(BankNo,BaseBank);
0160  if (GranMinusOne>0) then Inc(BankNo,GranMinusOne*CurrBank);
0161  asm
0162  MOV BX,0; MOV DX,BankNo; MOV AX,4F05h; INT 10h; MOV BX,1;
0163  MOV DX,BankNo; MOV AX,4F05h; INT 10h
0164  end;
0165  end;
0166
0167  procedure FillScreen(Index: Byte); Export;
0168  var C,Bank: Word; RamPtr: pByte;
0169  begin
0170  RamPtr:=Ptr(SegA000,0); C:=BankSize div 2;
0171  for Bank:=0 to Pred(PageSize) do
0172      begin
0173      SetVideoBank(Bank);
0174      asm LES DI,RamPtr; MOV CX,C; MOV AL,Index; MOV AH,Index; CLD; REP STOSW end;
0175      end;
0176  end;
0177
0178  procedure FillIt(Dest: Pointer; Count: Word; Value: Byte);
0179  begin
0180  asm
0181  LES DI,Dest; MOV AH,Value; MOV AL,Value; MOV CX,Count;
0182  SHR CX,1; CLD; REP STOSW; JNC @@DONE; STOSB
0183  @@DONE:
0184  end;
0185  end;
0186
0187  procedure MoveIt(Src,Dest: Pointer; Count: Word);
0188  begin
0189  asm
0190  PUSH DS; PUSH ES; PUSH SI; PUSH DI; LES DI,Dest; LDS SI,Src; MOV CX,Count; SHR CX,1;
0191  CLD; REP MOVSW; JNC @@DONE; MOVSB; @@DONE: POP DI; POP SI; POP ES; POP DS
0192  end;
0193  end;
0194
0195  procedure GetVideoAddr(X,Y: Word; var PixSeg,PixOff: Word);
0196  var SegLoc,OffLoc : Word;
0197  begin
0198  asm
0199  MOV AX,BytesPerScan; MOV BX,Y; MUL BX; MOV CX,X;
0200  ADD AX,CX; ADC DX,0; MOV SegLoc,DX; MOV OffLoc,AX
0201  end;
0202  PixSeg:=SegLoc; PixOff:=OffLoc;
0203  end;
0204
0205  function OkToDraw(X0,Y0,X1,Y1: Word): Boolean;
0206  begin OkToDraw:=((X0>=0) AND (Y0>=0) AND (X1<NumCol) AND (Y1<NumRow)); end;
0207
0208  function ReadPixel(X,Y: Integer): Byte; Export;
0209  var PixSeg,PixOff: Word;
0210  begin
0211  GetVideoAddr(X,Y,PixSeg,PixOff);
0212  if (PixSeg<>CurrBank) then SetVideoBank(PixSeg);
0213  ReadPixel:=Mem[SegA000:PixOff];
0214  end;
0215
0216  procedure WritePixel(X,Y: Integer; Index: Byte); Export;
0217  var PixSeg,PixOff: Word;
0218  begin
0219  GetVideoAddr(X,Y,PixSeg,PixOff);
0220  if (PixSeg<>CurrBank) then SetVideoBank(PixSeg); Mem[SegA000:PixOff]:=Index;
0221  end;
0222
0223  procedure SetLineStyle(Style: Word); Export; begin LineMask:=Style; end;
0224  procedure SetFillStyle(Style: Byte); Export;
0225  type DitherMatrix = Array[0..3,0..3] of Byte;
0226  const D : DitherMatrix= (($00, $08, $02, $0A), ($0C, $04, $0E, $07),
0227                           ($03, $0B, $01, $09), ($0F, $06, $0D, $05));
0228  var i,j : Integer;
0229  begin
0230  for i:=0 to 3 do for j:=0 to 3 do if (Style>D[i,j]) then
0231  FillBytes[i,j]:=FillColor else FillBytes[i,j]:=BackColor; DitherNum:=Style;
```

17

```
0232  end;
0233
0234  procedure SetFillColor(Index: Byte); Export; begin FillColor:=Index; end;
0235  procedure SetBackColor(Index: Byte); Export; begin BackColor:=Index; end;
0236  procedure SetForeColor(Index: Byte); Export; begin ForeColor:=Index; end;
0237  function GetFillColor: Byte; Export; begin GetFillColor:=FillColor; end;
0238  function GetBackColor: Byte; Export; begin GetBackColor:=BackColor; end;
0239  function GetForeColor: Byte; Export; begin GetForeColor:=ForeColor; end;
0240
0241  procedure SetPalette(Index,Red,Green,Blue: Word); Export;
0242
0243  begin
0244  asm
0245  MOV DX,03C8h; MOV AX,Index; OUT DX,AL; INC DX;      MOV AX,Red;
0246  OUT DX,AL;    MOV AX,Green; OUT DX,AL; MOV AX,Blue; OUT DX,AL;
0247  end;
0248  end;
0249
0250  function GetTextStyle: Word; Export; begin GetTextStyle:=TextMask; end;
0251
0252  procedure SetTextStyle(TextStyle: Word); Export;
0253  var RecNo: LongInt; Spec,Height: Word;
0254  begin
0255  TextMask:=TextStyle; RecNo:=(TextStyle AND FontStyleMask);
0256  if ((CurrRecNo<>RecNo) AND (RecNo<>0) AND (RecNo<FileSize(FontFil))) then
0257     begin CurrText:=RecNo; Seek(FontFil,RecNo); Read(FontFil,FontPtr^); end;
0258  Spec:=(TextStyle AND FontDirMask);
0259  if (Spec<>0) then VertFont:=(Spec=VertText);
0260  with FontPtr^[88] do
0261     begin
0262     Height:=MaxY-MinY; Spec:=(TextStyle AND FontVerMask);
0263     if (Spec<>0) then if (Spec=JustifyTop) then FontOff:=0 else
0264     if (Spec=JustifyBottom) then FontOff:=Height else
0265     FontOff:=Height div 2; Inc(FontOff,MinY);
0266     end;
0267  Spec:=(TextStyle AND FontHorMask); if (Spec<>0) then FontJust:=Spec;
0268  Spec:=(TextStyle AND FontSpaceMask);
0269  if (Spec<>0) then SqezText:=(Spec=PackedText);
0270  end;
0271
0272  function GetTextWidth(Message: String): Integer;
0273  var k,L,W: Integer;
0274  begin
0275  k:=1; W:=0; L:=Length(Message);
0276  while (k<=L) do with FontPtr^[Ord(Message[k])] do
0277     begin
0278     if SqezText then Inc(W,Diff) else Inc(W,Skip);
0279     if (SqezText AND (CurrText>TagFont)) then Dec(W,MinX); Inc(k);
0280     end;
0281  GetTextWidth:=W;
0282  end;
0283
0284  procedure GetTextDimen(Message: String; var Height,Width: Integer); Export;
0285  var k,dY: Integer;
0286  begin
0287  Height:=1; Width:=0;
0288  for k:=1 to Length(Message) do with FontPtr^[Ord(Message[k])] do
0289     begin
0290     dY:=MaxY-MinY; if (dY>Height) then Height:=dY;
0291     if SqezText then Inc(Width,Diff) else Inc(Width,Skip);
0292     if (SqezText AND (CurrText>TagFont)) then Dec(Width,MinX);
0293     end;
0294  Inc(Height);
0295  end;
0296
0297  procedure WriteText(X,Y: Integer; Message: String); Export;
0298  var Bits,Color,i,j,k,W: Word;
0299  begin
0300  W:=0;
0301  if ((FontJust=JustifyRight) or (FontJust=JustifyCenter))
0302  then W:=GetTextWidth(Message); if (FontJust=JustifyCenter) then W:=W div 2;
0303  if VertFont then Inc(Y,W) else Dec(X,W); Color:=GetForeColor;
0304  for k:=1 to Length(Message) do with FontPtr^[Ord(Message[k])] do
0305  if VertFont then
0306     begin
0307     if (SqezText AND (CurrText>TagFont)) then Dec(Y,MinX);
0308     for j:=MinY to MaxY do
0309        begin
```

18

```
0310        W:=j+X;
0311        if (W>FontOff) then
0312           begin
0313           Dec(W,FontOff); Bits:=Char[j];
0314           if (Bits>0) then
0315           for i:=MinX to MaxX do
0316              begin
0317              if ((Bits AND 1)>0) then WritePixel(W,Y-i,Color); Bits:=Bits SHR 1;
0318              end;
0319           end;
0320        end;
0321        if SqezText then Dec(Y,Diff) else Dec(Y,Skip);
0322        end else begin
0323        if (SqezText AND (CurrText>TagFont)) then Dec(X,MinX);
0324        for j:=MinY to MaxY do
0325           begin
0326           W:=j+Y;
0327           if (W>FontOff) then
0328              begin
0329              Dec(W,FontOff); Bits:=Char[j];
0330              if (Bits>0) then
0331              for i:=MinX to MaxX do
0332                 begin
0333                 if ((Bits AND 1)>0) then WritePixel(i+X,W,Color); Bits:=Bits SHR 1;
0334                 end;
0335              end;
0336           end;
0337        if SqezText then Inc(X,Diff) else Inc(X,Skip);
0338        end;
0339     end;
0340
0341     procedure ScanFill(X0,X1,Y,PixOff: Word);
0342     var BytesLoc: DitherLine; X: Word;
0343     begin
0344     case DitherNum of
0345        0  : FillIt(Ptr(SegA000,PixOff),Succ(X1-X0),BackColor);
0346        16 : FillIt(Ptr(SegA000,PixOff),Succ(X1-X0),FillColor);
0347     else
0348        BytesLoc:=FillBytes[Y AND $03];
0349        for X:=X0 to X1 do
0350           begin Mem[SegA000:PixOff]:=BytesLoc[X AND $03]; Inc(PixOff); end;
0351        end;
0352     end;
0353
0354     procedure WriteBar(X0,Y0,X1,Y1: Integer); Export;
0355     var X,Y,Bank: Word; dX,PixOff: LongInt;
0356     begin
0357     if OkToDraw(X0,Y0,X1,Y1) then
0358        begin
0359        GetVideoAddr(X0,Y0,Bank,Y); PixOff:=Y; dX:=X1-X0;
0360        if (Bank<>CurrBank) then SetVideoBank(Bank);
0361        for Y:=Y0 to Y1 do if ((PixOff+dX)>=BankSize) then
0362           begin
0363           X:=X0+(BankSize-PixOff);         ScanFill(X0,Pred(X),Y,PixOff);
0364           SetVideoBank(Succ(CurrBank)); ScanFill(X,X1,Y,0);
0365           Inc(PixOff,BytesPerScan);         Dec(PixOff,BankSize);
0366           end else begin
0367           ScanFill(X0,X1,Y,PixOff); Inc(PixOff,BytesPerScan);
0368           if (PixOff>=BankSize) then
0369              begin SetVideoBank(Succ(CurrBank)); Dec(PixOff,BankSize); end;
0370           end;
0371        end;
0372     end;
0373
0374     function FillArea(Xo,Yo,dY,A0,A1: Integer): Integer;
0375     var X,Y,X0,X1: Integer; Bytes: DitherLine; PixSeg,PixOff: Word; Pix: Byte;
0376     begin
0377     X0:=Xo; GetVideoAddr(X0,Yo,PixSeg,PixOff);
0378     if (PixSeg<>CurrBank) then SetVideoBank(PixSeg);
0379     Bytes:=FillBytes[Yo AND $03];
0380     repeat
0381        Mem[SegA000:PixOff]:=Bytes[X0 AND $03]; Dec(X0);
0382        GetVideoAddr(X0,Yo,PixSeg,PixOff);
0383        if (PixSeg<>CurrBank) then SetVideoBank(PixSeg); Pix:=Mem[SegA000:PixOff];
0384     until ((Pix=FillColor) OR (Pix=ForeColor));
0385     Inc(X0); X1:=Xo; GetVideoAddr(X1,Yo,PixSeg,PixOff);
0386     if (PixSeg<>CurrBank) then SetVideoBank(PixSeg);
0387     repeat
```

```
0388    Mem[SegA000:PixOff]:=Bytes[X1 AND $03]; Inc(X1);
0389    GetVideoAddr(X1,Yo,PixSeg,PixOff);
0390    if (PixSeg<>CurrBank) then SetVideoBank(PixSeg); Pix:=Mem[SegA000:PixOff];
0391    until ((Pix=FillColor) OR (Pix=ForeColor));
0392    Dec(X1); X:=X0; Y:=Yo+dY;
0393    while (X<=X1) do
0394       begin
0395       GetVideoAddr(X,Y,PixSeg,PixOff);
0396       if (PixSeg<>CurrBank) then SetVideoBank(PixSeg); Pix:=Mem[SegA000:PixOff];
0397       if ((Pix<>FillColor) AND (Pix<>ForeColor)) then X:=FillArea(X,Y,dY,X0,X1);
0398       Inc(X);
0399       end;
0400    X:=X0; Y:=Yo-dY;
0401    while (X<A0) do
0402       begin
0403       GetVideoAddr(X,Y,PixSeg,PixOff);
0404       if (PixSeg<>CurrBank) then SetVideoBank(PixSeg);
0405       Pix:=Mem[SegA000:PixOff]; if ((Pix<>FillColor) AND (Pix<>ForeColor))
0406       then X:=FillArea(X,Y,-dY,X0,X1); Inc(X);
0407       end;
0408    X:=A1;
0409    while (X<A1) do
0410       begin
0411       GetVideoAddr(X,Y,PixSeg,PixOff);
0412       if (PixSeg<>CurrBank) then SetVideoBank(PixSeg);
0413       Pix:=Mem[SegA000:PixOff]; if ((Pix<>FillColor) AND (Pix<>ForeColor))
0414       then X:=FillArea(X,Y,-dY,X0,X1); Inc(X);
0415       end;
0416    FillArea:=X1;
0417    end;
0418
0419    procedure FillBoundary(X,Y: Integer; Edge: Byte); Export;
0420    var ForeLoc : Byte;
0421    begin
0422    ForeLoc:=ForeColor; ForeColor:=Edge;
0423    X:=FillArea(X,Y,1,X,X); ForeColor:=ForeLoc;
0424    end;
0425
0426    procedure WriteLine(X0,Y0,X1,Y1: Integer); Export;
0427    var dX,dY,Count,Error,Quad: Integer;
0428    Mask,Bank,PixOff: Word; PixMem: LongInt;
0429    begin
0430    if (X1<X0) then
0431       begin Error:=X0; X0:=X1; X1:=Error; Error:=Y0; Y0:=Y1; Y1:=Error; end;
0432    dX:=X1-X0; dY:=Y1-Y0;
0433    if (dY<0) then
0434       begin
0435       if (-dY>dX) then begin Quad:=3; Count:=-dY; Error:=dY div 2; end else
0436          begin Quad:=4; Count:=dX; Error:=-dX div 2; end;
0437       end else begin
0438       if (dY>dX) then
0439          begin Quad:=2; Count:=dY; Error:=-dY div 2; end else
0440          begin Quad:=1; Count:=dX; Error:=-dX div 2; end;
0441       end;
0442    Inc(Count); GetVideoAddr(X0,Y0,Bank,PixOff);
0443    if (Bank<>CurrBank) then SetVideoBank(Bank); PixMem:=PixOff; Mask:=$8000;
0444    while (Count>0) do
0445       begin
0446       PixOff:=Word(PixMem);
0447       if (LineMask=$FFFF) then Mem[SegA000:PixOff]:=ForeColor else
0448          begin
0449          if ((Mask AND LineMask)=0) then Mem[SegA000:PixOff]:=ForeColor
0450          else Mem[SegA000:PixOff]:=BackColor;
0451          asm MOV AX,Mask; ROR AX,1; MOV Mask,AX; end;
0452          end;
0453       Dec(Count);
0454       if (Count>0) then
0455          begin
0456          case Quad of
0457             1: begin
0458                Inc(X0); Inc(Error,dY); Inc(PixMem);
0459                if (PixMem=BankSize) then
0460                   begin SetVideoBank(Succ(CurrBank)); PixMem:=0; end;
0461                if (Error>0) then
0462                   begin
0463                   Inc(Y0); Dec(Error,dX); Inc(PixMem,BytesPerScan);
0464                   if (PixMem>=BankSize) then
0465                      begin SetVideoBank(Succ(CurrBank)); Dec(PixMem,BankSize); end;
```

```
0466              end;
0467           end;
0468        2: begin
0469           Inc(Y0); Inc(Error,dX); Inc(PixMem,BytesPerScan);
0470           if (PixMem>=BankSize) then
0471              begin SetVideoBank(Succ(CurrBank)); Dec(PixMem,BankSize); end;
0472           if (Error>0) then
0473              begin
0474              Inc(X0); Dec(Error,dY); Inc(PixMem);
0475              if (PixMem=BankSize) then
0476                 begin SetVideoBank(Succ(CurrBank)); PixMem:=0; end;
0477              end;
0478           end;
0479        3: begin
0480           Dec(Y0); Inc(Error,dX); Dec(PixMem,BytesPerScan);
0481           if (PixMem<0) then
0482              begin SetVideoBank(Pred(CurrBank)); Inc(PixMem,BankSize); end;
0483           if (Error>0) then
0484              begin
0485              Inc(X0); Inc(Error,dY); Inc(PixMem);
0486              if (PixMem=BankSize) then
0487                 begin SetVideoBank(Succ(CurrBank)); PixMem:=0; end;
0488              end;
0489           end;
0490        4: begin
0491           Inc(X0); Dec(Error,dY); Inc(PixMem);
0492           if (PixMem=BankSize) then
0493              begin SetVideoBank(Succ(CurrBank)); PixMem:=0; end;
0494           if (Error>0) then
0495              begin
0496              Dec(Y0); Dec(Error,dX); Dec(PixMem,BytesPerScan);
0497              if (PixMem<0) then
0498                 begin SetVideoBank(Pred(CurrBank)); Inc(PixMem,BankSize); end;
0499              end;
0500           end;
0501        end;
0502     end;
0503   end;
0504 end;
0505
0506 procedure WriteRectangle(X0,Y0,X1,Y1: Integer; Fill: Boolean); Export;
0507 begin
0508 if OkToDraw(X0,Y0,X1,Y1) then
0509    begin
0510    if Fill then WriteBar(X0,Y0,X1,Y1); WriteLine(X0,Y0,X1,Y0);
0511    WriteLine(X0,Y1,X1,Y1); WriteLine(X0,Y0,X0,Y1); WriteLine(X1,Y0,X1,Y1);
0512    end;
0513 end;
0514
0515 procedure WriteTriangle(X1,Y1,X2,Y2,X3,Y3: Integer; Fill: Boolean); Export;
0516 var LineStyle: Word;
0517 begin
0518 if Fill then begin LineStyle:=LineMask; LineMask:=$FFFF; end;
0519 WriteLine(X1,Y1,X2,Y2); WriteLine(X1,Y1,X3,Y3); WriteLine(X2,Y2,X3,Y3);
0520 if Fill then
0521    begin
0522    FillBoundary((X1+X2+X3) div 3,(Y1+Y2+Y3) div 3,ForeColor);
0523    if (LineStyle<>$FFFF) then
0524       begin
0525       LineMask:=LineStyle; WriteLine(X1,Y1,X2,Y2);
0526       WriteLine(X1,Y1,X3,Y3); WriteLine(X2,Y2,X3,Y3);
0527       end;
0528    end;
0529 end;
0530
0531 procedure WriteCirclePoints(Xo,Yo,X,Y: Integer);
0532 var A,B,C,D,E,F,G,H: Integer;
0533 begin
0534 A:=Xo+X; B:=Xo-X; C:=Yo+Y; D:=Yo-Y; E:=Xo+Y; F:=Xo-Y; G:=Yo+X; H:=Yo-X;
0535 WritePixel(A,C,ForeColor); WritePixel(E,G,ForeColor);
0536 WritePixel(E,H,ForeColor); WritePixel(A,D,ForeColor);
0537 WritePixel(B,D,ForeColor); WritePixel(F,H,ForeColor);
0538 WritePixel(F,G,ForeColor); WritePixel(B,C,ForeColor);
0539 end;
0540
0541 procedure WriteCircle(X,Y,R: Integer; Fill: Boolean); Export;
0542 var A,B,D: Integer;
0543 begin
```

```
0544    A:=0; B:=R; D:=3-(R SHL 1);
0545    while (A<B) do
0546       begin
0547       WriteCirclePoints(X,Y,A,B);
0548       if (D<0) then
0549          begin Inc(D,A SHL 2); Inc(D,6); end else
0550          begin Inc(D,(A-B) SHL 2); Inc(D,10); Dec(B); end;
0551       Inc(A);
0552       end;
0553    if (A=B) then WriteCirclePoints(X,Y,A,B); if Fill then FillBoundary(X,Y,ForeColor);
0554    end;
0555
0556    procedure WriteCrossHairs(X,Y,S: Integer); Export;
0557    var X0,X1,Y0,Y1 : Integer;
0558    begin
0559    X0:=X-S; X1:=X+S; Y0:=Y-S; Y1:=Y+S;
0560    WriteLine(X0,Y1,X1,Y0); WriteLine(X0,Y0,X1,Y1);
0561    end;
0562
0563    procedure WriteWye(X,Y,S: Integer); Export;
0564    var Y0 : Integer;
0565    begin
0566    Y0:=Y-S; WriteLine(X-S,Y0,X,Y); WriteLine(X+S,Y0,X,Y); WriteLine(X,Y,X,Y+S);
0567    end;
0568
0569    procedure WriteDiamond(X,Y,S: Integer; Fill: Boolean); Export;
0570    var X0,X1,Y0,Y1: Integer; Style: Word;
0571
0572    begin
0573    if Fill then begin Style:=LineMask; LineMask:=$FFFF; end;
0574    Inc(S); X0:=X-S; X1:=X+S; Y0:=Y-S; Y1:=Y+S;
0575    WriteLine(X0,Y,X,Y0); WriteLine(X,Y0,X1,Y);
0576    WriteLine(X1,Y,X,Y1); WriteLine(X,Y1,X0,Y);
0577    if Fill then
0578       begin
0579       FillBoundary(X,Y,ForeColor);
0580       if (Style<>$FFFF) then
0581          begin
0582          LineMask:=Style; WriteLine(X0,Y,X,Y0); WriteLine(X,Y0,X1,Y);
0583          WriteLine(X1,Y,X,Y1); WriteLine(X,Y1,X0,Y);
0584          end;
0585       end;
0586    end;
0587
0588    procedure WriteCross(X,Y,S: Integer); Export;
0589    begin WriteLine(X-S,Y,X+S,Y); WriteLine(X,Y-S,X,Y+S); end;
0590
0591    procedure WriteStar(X,Y,S: Integer); Export;
0592    var X0,X1,Y0,Y1: Integer;
0593    begin
0594    X0:=X-S; X1:=X+S; Y0:=Y-S; Y1:=Y+S; WriteLine(X0,Y1,X1,Y0);
0595    WriteLine(X0,Y0,X1,Y1); WriteLine(X0,Y,X1,Y); WriteLine(X,Y0,X,Y1);
0596    end;
0597
0598    procedure WriteTag(Border: Boolean; Justify: Char;
0599                      Back,Fore,PosX,PosY: Integer; TagStr: String); Export;
0600    var X0,Y0,X1,Y1,dX,dY,dX2,dY2 : Integer;
0601    begin
0602    SetTextStyle(TinyFont+HorizText+JustifyMiddle+JustifyCenter+TableText);
0603    GetTextDimen(TagStr,dY2,dX2); Inc(dX2,2); Inc(dY2,2);
0604    if Border then begin Inc(dX2,2); Inc(dY2,2); end;
0605    dX:=dX2 div 2; dY:=dY2 div 2; X0:=PosX-dX;
0606    X1:=PosX+dX; Y0:=PosY-dY; Y1:=PosY+dY;
0607    case Justify of
0608       'L' : begin X0:=PosX;      X1:=PosX+dX2; end;
0609       'R' : begin X1:=PosX;      X0:=PosX-dX2; end;
0610       'T' : begin Y0:=PosY;      Y1:=PosY+dY2; end;
0611       'B' : begin Y0:=PosY-dY2; Y1:=PosY; end;
0612       end;
0613    SetFillColor(Back); WriteBar(X0,Y0,X1,Y1); SetForeColor(Fore);
0614    if Border then WriteRectangle(X0,Y0,X1,Y1,False);
0615    WriteText(Succ((X0+X1) div 2),(Y0+Y1) div 2,TagStr);
0616    end;
0617
0618    procedure WriteSymbol(Spec,Size,X,Y: Integer); Export;
0619    begin
0620    case Spec of
0621       StarF         : WriteStar(X,Y,Size);
```

```
0622      CrossHairF     : WriteCrossHairs(X,Y,Size);
0623      CrossF         : WriteCross(X,Y,Size);
0624      WyeF           : WriteWye(X,Y,Size);
0625      DiamondF       : WriteDiamond(X,Y,Size,True);
0626      DiamondFillF   : WriteDiamond(X,Y,Size,False);
0627      BarF           : WriteBar(X-Size,Y-Size,X+Size,Y+Size);
0628      RectangleF     : WriteRectangle(X-Size,Y-Size,X+Size,Y+Size,False);
0629      CircleF        : WriteCircle(X,Y,Size,True);
0630      CircleFillF    : WriteCircle(X,Y,Size,False);
0631      TriangleF      : WriteTriangle(X,Y-Size,X-Size,Y+Size,X+Size,Y+Size,True);
0632      TriangleFillF  : WriteTriangle(X,Y-Size,X-Size,Y+Size,X+Size,Y+Size,False);
0633      PointF         : WritePixel(X,Y,ForeColor);
0634      end;
0635    end;
0636
0637    procedure WritePolygon(Cnt,Spec,Size,Yb: Integer; var Poly: PolygonArray);
0638    Export; var i,X,Y,X0,Y0,X1,Y1: Integer; DoWriteLine,DoHist,DoSymb: Boolean;
0639    begin
0640    DoWriteLine:=(Yb=1); DoHist:=(Yb>1); DoSymb:=(Spec>0);
0641    with Poly[1] do begin X:=LocX; Y:=LocY; end;
0642    if DoHist then WriteBar(X,Yb,Poly[2].LocX,Y) else
0643    if DoSymb then WriteSymbol(Spec,Size,X,Y);
0644    for i:=2 to Cnt do with Poly[i] do
0645      begin
0646      if DoHist then WriteBar(X,Y,LocX,Yb) else
0647        begin
0648        if DoSymb then WriteSymbol(Spec,Size,LocX,LocY);
0649        if DoWriteLine then WriteLine(X,Y,LocX,LocY);
0650        end;
0651      X:=LocX; Y:=LocY;
0652      end;
0653    end;
0654
0655    procedure UpdatePolygon(Y,Cnt,Spec,Size,Yb: Integer; var Poly: PolygonArray); Export;
0656    var Temp: PolygonArray; i,Fore: Word;
0657    begin
0658    if (Cnt<=MaxPolySize) then
0659      begin
0660      Move(Poly,Temp,4*Cnt);
0661      for i:=1 to Pred(Cnt) do Poly[i].LocY:=Poly[Succ(i)].LocY;
0662      Poly[Cnt].LocY:=Y; Fore:=ForeColor;
0663      ForeColor:=BackColor; WritePolygon(Cnt,Spec,Size,Yb,Temp);
0664      ForeColor:=Fore; WritePolygon(Cnt,Spec,Size,Yb,Poly);
0665      end;
0666    end;
0667
0668    procedure ReadPicture(X,Y,Width,Height: Integer; ImgPtr: Pointer); Export;
0669    var PixMem: LongInt; MemPtr: pByte; Index,Diff: Word;
0670    begin
0671    if OkToDraw(X,Y,Pred(X+Width),Pred(Y+Height)) then
0672      begin
0673      MemPtr:=ImgPtr; GetVideoAddr(X,Y,Diff,Index);
0674      if (Diff<>CurrBank) then SetVideoBank(Diff); PixMem:=Index;
0675      for Index:=1 to Height do if ((PixMem+Width)>=BankSize) then
0676        begin
0677        Diff:=BankSize-PixMem; MoveIt(Ptr(SegA000,PixMem),MemPtr,Diff);
0678        Inc(MemPtr,Diff); SetVideoBank(Succ(CurrBank)); Diff:=Width-Diff;
0679        MoveIt(Ptr(SegA000,0),MemPtr,Diff); Inc(MemPtr,Diff);
0680        Inc(PixMem,BytesPerScan); Dec(PixMem,BankSize);
0681        end else begin
0682        MoveIt(Ptr(SegA000,PixMem),MemPtr,Width);
0683        Inc(MemPtr,Width); Inc(PixMem,BytesPerScan);
0684        if (PixMem>=BankSize) then
0685            begin SetVideoBank(Succ(CurrBank)); Dec(PixMem,BankSize); end;
0686        end;
0687      end;
0688    end;
0689
0690    procedure WritePicture(X,Y,Width,Height: Integer; ImgPtr: Pointer); Export;
0691    var PixMem: LongInt; MemPtr: pByte; Index,Diff: Word;
0692    begin
0693    if OkToDraw(X,Y,Pred(X+Width),Pred(Y+Height)) then
0694      begin
0695      MemPtr:=ImgPtr; GetVideoAddr(X,Y,Diff,Index);
0696      if (Diff<>CurrBank) then SetVideoBank(Diff); PixMem:=Index;
0697      for Index:=1 to Height do if ((PixMem+Width)>=BankSize) then
0698        begin
0699        Diff:=BankSize-PixMem; MoveIt(MemPtr,Ptr(SegA000,PixMem),Diff);
```

```
0700        Inc(MemPtr,Diff); SetVideoBank(Succ(CurrBank));
0701        Diff:=Width-Diff; MoveIt(MemPtr,Ptr(SegA000,0),Diff);
0702        Inc(MemPtr,Diff); Inc(PixMem,BytesPerScan); Dec(PixMem,BankSize);
0703        end else begin
0704        MoveIt(MemPtr,Ptr(SegA000,PixMem),Width); Inc(MemPtr,Width);
0705        Inc(PixMem,BytesPerScan);
0706        if (PixMem>=BankSize) then
0707            begin SetVideoBank(Succ(CurrBank)); Dec(PixMem,BankSize); end;
0708        end;
0709    end;
0710 end;
0711
0712 procedure MoveWindow(X,Y,Width,Height,dX,dY: Integer); Export;
0713 type VidBuf = Array[1..16386] of Byte;
0714 var pBuf : ^VidBuf; H: Word; Area,Hmax,Htot : LongInt;
0715 begin
0716 New(pBuf); Htot:=0; Hmax:=16386 div Width; if (Hmax>Height) then Hmax:=Height;
0717 repeat
0718    H:=Height-Htot; if (H>Hmax) then H:=Hmax;
0719    ReadPicture(X+dX,Y+dY,Width,H,pBuf);
0720    WritePicture(X,Y,Width,H,pBuf); Inc(Htot,H); Inc(Y,H);
0721 until (Htot>=Height);
0722 Dispose(pBuf);
0723 end;
0724
0725 procedure MoveScreen(X,Y: Word); Export;
0726 begin
0727 asm MOV AX,4F07h; MOV BX,0000h; MOV CX,X; MOV DX,Y; INT 10h; end;
0728 end;
0729
0730 procedure ByteCopy(MemPtr: pByte; PixOff,Count: Word; ExOr: Boolean); Export;
0731 var VidPtr : pByte; i: Word;
0732 begin
0733 VidPtr:=Ptr(SegA000,PixOff);
0734 if ExOr then
0735    begin
0736    for i:=1 to Count do
0737        begin VidPtr^:=VidPtr^ OR MemPtr^; Inc(VidPtr); Inc(MemPtr); end;
0738    end else begin
0739    for i:=1 to Count do
0740        begin VidPtr^:=VidPtr^ AND MemPtr^; Inc(VidPtr); Inc(MemPtr); end;
0741    end;
0742 end;
0743
0744 procedure BitBlt(X,Y,Width,Height: Integer; Exor: Boolean; BufPtr: Pointer); Export;
0745 var MemPtr : pByte; Bank,Index,Diff: Word; PixOff : LongInt;
0746 begin
0747 if OkToDraw(X,Y,Pred(X+Width),Pred(Y+Height)) then
0748    begin
0749    MemPtr:=BufPtr; GetVideoAddr(X,Y,Bank,Index);
0750    if (Bank<>CurrBank) then SetVideoBank(Bank); PixOff:=Index;
0751    for Index:=1 to Height do if ((PixOff+Width) >= BankSize) then
0752        begin
0753        Diff:=BankSize-PixOff; ByteCopy(MemPtr,PixOff,Diff,ExOr);
0754        Inc(MemPtr,Diff); SetVideoBank(Succ(CurrBank));
0755        Diff:=Width-Diff; ByteCopy(MemPtr,0,Diff,ExOr);
0756        Inc(MemPtr,Diff); Inc(PixOff,BytesPerScan); Dec(PixOff,BankSize);
0757        end else begin
0758        ByteCopy(MemPtr,PixOff,Width,ExOr); Inc(MemPtr,Width);
0759        Inc(PixOff,BytesPerScan);
0760        if (PixOff>=BankSize) then
0761            begin SetVideoBank(Succ(CurrBank)); Dec(PixOff,BankSize); end;
0762        end;
0763    end;
0764 end;
0765
0766 function BadFile(FileName: String) : Boolean;
0767 var DatF: File; Found: Boolean;
0768 begin
0769 {$I-}
0770 Assign(DatF,FileName); FileMode:=0;
0771 Reset(DatF); Close(DatF); FileMode:=2;
0772 {$I+}
0773 BadFile:=(IOResult<>0);
0774 end;
0775
0776 function InitGraph(Mode: Word; PathToFiles: String): Integer; Export;
0777 label 99; const BiosSeg: LongInt = $C000; NumLogo : Word = 20;
```

```
0778  type
0779     ColorRecord = Record RedVal,GrnVal,BluVal : Byte; end;
0780     ColorFile = File of ColorRecord; LogoType = Array[0..63629] of Byte;
0781     LogoFile  = File of LogoType;
0782  var
0783     ModeName,LogoName,FontName,PaleName: String; ModeFil: ModeFile;
0784     PaleFil: ColorFile; LogoFil: LogoFile; PaleRec: ColorRecord;
0785     Logo: ^LogoType; PageAddr: LongInt; ErrCode: Integer;
0786     Selector,Index,A,B,IoAddr: Word;
0787  begin
0788  ModeName:=PathToFiles+'A'; LogoName:=PathToFiles+'L';
0789  FontName:=PathToFiles+'F'; PaleName:=PathToFiles+'C';
0790  New(ModeInfo); Assign(ModeFil,ModeName); Reset(ModeFil);
0791  Read(ModeFil,ModeInfo^); Close(ModeFil); OrigMode:=LastMode;
0792  OrigAttr:=TextAttr; ErrCode:=NoSuchFile;
0793  if (BadFile(ModeName) OR BadFile(LogoName) OR
0794      BadFile(FontName) OR BadFile(PaleName)) then goto 99;
0795  Selector:=AllocSelector(0); Index:=SetSelectorLimit(Selector,$0000FFFF);
0796  Index:=SetSelectorBase(Selector,BiosSeg); ErrCode:=Ord(not DetectIfVesa);
0797  Index:=FreeSelector(Selector); if (ErrCode<>GraphSysOn) then goto 99;
0798  with ModeInfo^[Mode] do
0799     begin
0800     ErrCode:=MemTooSmall; if (MemorySize<MemReq) then goto 99;
0801     ErrCode:=NoSuchMode; if (AxReg=0) then goto 99;
0802     DirectVideo:=False; Assign(FontFil,FontName);
0803     Reset(FontFil); New(FontPtr);
0804     SetTextStyle(SansFont+HorizText+JustifyTop+TableText);
0805     A:=AxReg; B:=BxReg; asm MOV AX,A; MOV BX,B; INT 10h end;
0806     NumCol:=HorRes; NumRow:=VerRes; VideoMode:=Mode; CurrBank:=$FF;
0807     BytesPerScan:=NumCol; InitVesa;
0808     PageAddr:=LongInt(NumRow)*LongInt(BytesPerScan);
0809     PageSize:=PageAddr div BankSize;
0810     Inc(PageSize,Ord((PageAddr mod BankSize)<>0)); SetVideoBank(0);
0811     end;
0812  Assign(PaleFil,PaleName); Reset(PaleFil); Index:=0;
0813  while (Index<=255) do
0814     begin
0815     Read(PaleFil,PaleRec);
0816     with PaleRec do SetPalette(Index,RedVal,GrnVal,BluVal); Inc(Index);
0817     end;
0818  FillScreen(61); Close(PaleFil); Assign(LogoFil,LogoName); Reset(LogoFil);
0819  New(Logo); Read(LogoFil,Logo^); A:=(NumCol div 2); B:=(NumRow div 2);
0820  Dec(A,NumLogo+151); Dec(B,NumLogo+105);
0821  for Index:=1 to NumLogo do
0822     begin
0823     WritePicture(A,B,303,210,Logo); if ((Index=1) OR (Index=NumLogo)) then
0824     WriteRectangle(A,B,A+302,B+209,False); Inc(A); Inc(B);
0825     end;
0826  Dispose(Logo); Delay(1000); Close(LogoFil); ErrCode:=GraphSysOn;
0827  99: Dispose(ModeInfo); InitGraph:=ErrCode;
0828  end;
0829
0830  procedure TermGraph; Export;
0831  begin
0832  DirectVideo:=True; TextMode(OrigMode); TextAttr:=OrigAttr;
0833  EnableInterrupts; Dispose(FontPtr); Close(FontFil);
0834  end;
0835
0836  procedure GetScreenDimen(var Width,Height: Integer); Export;
0837  begin Width:=NumCol; Height:=NumRow; end;
0838
0839  procedure GetGraphParam(var Param: GraphParameters); Export;
0840  begin
0841  with Param do
0842     begin
0843     ForeIndex:=ForeColor; BackIndex:=BackColor; FillIndex:=FillColor;
0844     LineStyle:=LineMask; FillStyle:=DitherNum; TextStyle:=TextMask;
0845     end;
0846  end;
0847
0848  procedure SetGraphParam(var Param: GraphParameters); Export;
0849  begin
0850  with Param do
0851     begin
0852     ForeColor:=ForeIndex; BackColor:=BackIndex; FillColor:=FillIndex;
0853     LineMask:=LineStyle; SetFillStyle(FillStyle); SetTextStyle(TextMask);
0854     end;
0855  end;
```

```
0856
1030  exports
1031    FillScreen       Index 01, ReadPixel       Index 02, WritePixel      Index 03,
1032    SetLineStyle     Index 04, SetFillStyle    Index 05, SetFillColor    Index 06,
1033    SetBackColor     Index 07, SetForeColor    Index 08, GetFillColor    Index 09,
1034    GetBackColor     Index 10, GetForeColor    Index 11, SetPalette      Index 12,
1035    GetTextStyle     Index 13, SetTextStyle    Index 14, GetTextDimen    Index 15,
1036    WriteText        Index 16, WriteBar        Index 17, FillBoundary    Index 18,
1037    WriteLine        Index 19, WriteRectangle  Index 20, WriteTriangle   Index 21,
1038    WriteCircle      Index 22, WriteCrossHairs Index 23, WriteWye        Index 24,
1039    WriteDiamond     Index 25, WriteCross      Index 26, WriteStar       Index 27,
1040    WriteTag         Index 28, WriteSymbol     Index 29, WritePolygon    Index 30,
1041    UpdatePolygon    Index 31, ReadPicture     Index 32, WritePicture    Index 33,
1042    BitBlt           Index 34, MoveWindow      Index 35, MoveScreen      Index 36,
1043    InitGraph        Index 37, TermGraph       Index 38, GetScreenDimen  Index 39,
1044    GetGraphParam    Index 40, SetGraphParam   Index 41;
1049
1050  begin end.
```

Table 2: 16-Bit 8253/8254 Timer Chip Device Interface Source Code

```
1051  library Timer; {$F+}
1052  {* Copyright (c) 1997 Interstate Robotics, Incorporated.  All rights reserved. *}
1053  uses Dos,Crt,Dpmi;
1054
1055  procedure DisableInterrupts; inline($FA);
1056  procedure EnableInterrupts; inline($FB);
1057  const
1058      Infinity      = $FFFF;    Immediate     = $FFFE;  MaxNoProc = 64;
1059      NullProc      = 0;        BroadCast     = 0;      TimerFreq = 1193180;
1060      i8253CrtlAddr = $43;      i8253DataAddr = $40;    SchedOn   = $FFFF;
1061      SchedOff      = $0000;    IntrBase      = $00C0;  MaxVectNo = $FF;
1062  type
1063      ActvProcedure = procedure(Flags,CS,IP,AX,BX,CX,DX,SI,DI,DS,ES,BP: Word); Interrupt;
1064      CommProcedure = procedure(Src,Code,Size: Word; DescPtr,DataPtr: Pointer);
1065      ProcessRecord = Record
1066          CommProc: CommProcedure; OldVect,DescPtr: Pointer; DescSeg,
1067          DescOfs,VectNum,EventToGo,TicksToGo,ActPeriod,ActPhase: Word;
1068          OkToRun: Boolean;
1069          end;
1070      ProcessArray     = Array[1..MaxNoProc]  of ProcessRecord;
1071      ProcXReference   = Array[IntrBase..MaxVectNo] of Word;
1072      ProcArrayPointer = ^ProcessArray; ProcXRefPointer = ^ProcXReference;
1073  const
1074      NumTicks: Word=$FFFF; SchedState: Word=SchedOff; NumProc:Integer = 0;
1075  var
1076      ProcPtr       : ProcArrayPointer; XRefPtr    : ProcXRefPointer;
1077      x08IntVect    : Pointer;          i8253Count : Word;
1078      PhaseCount    : Word;
1079
1080  function GetTimerTicks: Word; Export; begin GetTimerTicks:=NumTicks; end;
1081
1082  procedure GetSchedParam(var RegVal,RefVal: Word); Export;
1083  begin RegVal:=i8253Count; RefVal:=PhaseCount; end;
1084
1085  procedure SendPacket(Src,Dst,Code,Size: Word; DataPtr: Pointer); Export;
1086  var Index: Word;
1087  begin
1088  if (Dst=Broadcast) then
1089      begin
1090      for Index:=1 to NumProc do
1091      with ProcPtr^[Index] do CommProc(Src,Code,Size,DescPtr,DataPtr);
1092      end else begin if ((Dst>0) AND (Dst<=NumProc)) then
1093      with ProcPtr^[Dst] do CommProc(Src,Code,Size,DescPtr,DataPtr);
1094      end;
1095  end;
1096
1097  procedure SetCommProc(ProcId: Word; CommProc: CommProcedure); Export;
1098  begin if (ProcId in [1..NumProc]) then ProcPtr^[ProcId].CommProc:=CommProc; end;
1099
1100  procedure NullComm(Src,Code,Size: Word; DescPtr,DataPtr: Pointer); begin end;
1101
1102  function SchedProcess(Enable: Boolean; Count,Period,Phase: Word;
1103                       DscPtr,IntPtr: Pointer): Word; Export;
1104  type PointerRecord = Record Offset,Segment: Word; end;
1105  var PtrRec : PointerRecord;
1106  begin
1107  if (NumProc>=MaxNoProc) then SchedProcess:=NullProc else
1108      begin
1109      DisableInterrupts; Inc(NumProc);
1110      with ProcPtr^[NumProc] do
1111          begin
1112          OkToRun:=Enable; EventToGo:=Count;
1113          ActPhase:=Phase; ActPeriod:=Period;
1114          if (Phase=Immediate) then TicksToGo:=1 else
1115              begin
1116              Phase:=Phase mod Period;
1117              TicksToGo:=Phase+PhaseCount-(NumTicks mod PhaseCount);
1118              end;
1119          Move(DscPtr,PtrRec,4);
1120          with PtrRec do begin DescSeg:=Segment; DescOfs:=Offset; end;
1121          DescPtr:=DscPtr; CommProc:=NullComm; VectNum:=NumProc+Pred(IntrBase);
1122          GetIntVec(VectNum,OldVect); SetIntVec(VectNum,IntPtr);
```

```
1123        XRefPtr^[VectNum]:=NumProc; SchedProcess:=VectNum;
1124      end;
1125    EnableInterrupts;
1126    end;
1127 end;
1128
1129 procedure RemoveProcess(ProcId: Word); Export;
1130 var Index : Word;
1131 begin
1132 DisableInterrupts; Index:=XRefPtr^[ProcId];
1133 if (Index in [1..NumProc]) then
1134 with ProcPtr^[Index] do
1135    begin
1136    SetIntVec(VectNum,OldVect); XRefPtr^[VectNum]:=NullProc;
1137    if (Index<NumProc) then
1138       begin ProcPtr^[Index]:=ProcPtr^[NumProc]; XRefPtr^[VectNum]:=Index; end;
1139    Dec(NumProc);
1140    end;
1141 EnableInterrupts;
1142 end;
1143
1144 procedure EnableProcess(ProcId: Word); Export;
1145 var Index : Word;
1146 begin
1147 Index:=XRefPtr^[ProcId];
1148 if (Index in [1..NumProc]) then ProcPtr^[Index].OkToRun:=True;
1149 end;
1150
1151 procedure DisableProcess(ProcId: Word); Export;
1152 var Index : Word;
1153 begin
1154 Index:=XRefPtr^[ProcId];
1155 if (Index in [1..NumProc]) then ProcPtr^[Index].OkToRun:=False;
1156 end;
1157
1158 procedure UpdateScheduler; Interrupt;
1159 var Index: Word; Regs: Registers;
1160 begin
1161 DisableInterrupts; Inc(NumTicks);
1162 if (SchedState=SchedOn) then
1163    begin
1164    SchedState:=SchedOff;
1165    with Regs do
1166       begin
1167       ES:=$0000; DS:=$0000; AX:=NumTicks; Index:=1;
1168       while (Index<=NumProc) do with ProcPtr^[Index] do
1169       if (not OkToRun) then Inc(Index) else
1170          begin
1171          BX:=Index; Dec(TicksToGo);
1172          if (TicksToGo>0) then Inc(Index) else
1173             begin
1174             TicksToGo:=ActPeriod; SI:=DescSeg; DI:=DescOfs;
1175             if (EventToGo=Infinity) then
1176                begin
1177                Intr(VectNum,Regs); Inc(Index);
1178                end else begin
1179                Dec(EventToGo); CX:=EventToGo; Intr(VectNum,Regs);
1180                if (EventToGo>0) then Inc(Index) else
1181                   begin
1182                   SetIntVec(VectNum,OldVect); XRefPtr^[VectNum]:=NullProc;
1183                   if (Index<NumProc) then
1184                      begin
1185                      ProcPtr^[Index]:=ProcPtr^[NumProc];
1186                      XRefPtr^[VectNum]:=Index;
1187                      end;
1188                   Dec(NumProc);
1189                   end;
1190                end;
1191             end;
1192          end;
1193       end;
1194    SchedState:=SchedOn;
1195    end;
1196 asm MOV AL,20h; OUT 20h,AL; POP AX; POP DS end; EnableInterrupts;
1197 end;
1198
1199 procedure GetProcList(var NumPtr: pInteger; var ListPtr: ProcArrayPointer); Export;
1200 begin NumPtr:=Addr(NumProc); ListPtr:=ProcPtr; end;
```

28

```
1201
1202   procedure InitScheduler(RegVal,RefVal: Word); Export;
1203   var Regs: Registers;
1204   begin
1205   NumTicks:=$0000; New(ProcPtr); New(XRefPtr);
1206   FillChar(XRefPtr^,SizeOf(ProcXReference),0);
1207   SchedState:=SchedOff; Port[i8253CrtlAddr]:=$34;
1208   Port[i8253DataAddr]:=0; Port[i8253DataAddr]:=0;
1209   if (RegVal<120) then RegVal:=120; i8253Count:=RegVal;
1210   PhaseCount:=RefVal; DisableInterrupts; GetIntVec($08,x08IntVect);
1211   SetIntVec($08,@UpdateScheduler); Port[i8253CrtlAddr]:=$34;
1212   Port[i8253DataAddr]:=i8253Count AND $00FF;
1213   Port[i8253DataAddr]:=(i8253Count AND $FF00) SHR 8; EnableInterrupts;
1214   end;
1215
1216   procedure EnableScheduler; Export; begin SchedState:=SchedOn; end;
1217   procedure DisableScheduler; Export; begin SchedState:=SchedOff; end;
1218   procedure TermScheduler; Export;
1219   var VectNo : Integer;
1220   begin
1221   SchedState:=SchedOff;
1222   for VectNo:=IntrBase to MaxVectNo do RemoveProcess(VectNo);
1223   Dispose(ProcPtr); Dispose(XRefPtr); DisableInterrupts;
1224   SetIntVec($08,x08IntVect); Port[i8253CrtlAddr]:=$34;
1225   Port[i8253DataAddr]:=0; Port[i8253DataAddr]:=0; EnableInterrupts;
1226   Port[i8253CrtlAddr]:=$36; Port[i8253DataAddr]:=0; Port[i8253DataAddr]:=0;
1227   end;
1228
1229   exports
1230      GetTimerTicks   Index 01,   GetSchedParam   Index 02, GetProcList      Index 03,
1231      InitScheduler   Index 04,   SetCommProc     Index 05, SendPacket       Index 06,
1232      SchedProcess    Index 07,   RemoveProcess   Index 08, EnableProcess    Index 09,
1233      DisableProcess  Index 10,   EnableScheduler Index 11, DisableScheduler Index 12,
1234      TermScheduler   Index 13;
1235
1236   begin end.
```

What is claimed is:

1. A computer implemented method of interfacing between a plurality of application programs and a physical device, said computer implemented method comprising the steps of:

(a) providing a library of routines to control and implement different functions specific to said physical device;

(b) dynamically linking said library of routines to said plurality of application programs;

(c) providing a memory for storing private data which influences the behavior of said library of routines;

(d) providing a means for updating said private data in order to record state information during periods in which said library of routines are inactive, whereby said application programs utilize said library of routines to control and communicate with said physical device, and whereby said application programs utilize said library of routines to perform tasks that require utilization of said physical device; and (e) updating said private data in response to interrupts generated by said physical device.

2. The method according to claim 1 wherein said physical device is a video graphics adapter.

3. The computer implemented method of claim 1, wherein said step of updating said private data and activating said application program is done as a function of said private data in response to interrupts originating from said physical device.

4. The method according to claim 3 wherein said physical device is a timer-chip.

5. The method according to claim 4 wherein interrupts generated by said timer-chip are delivered directly to application programs according to user-defined timelines.

* * * * *